(12) United States Patent
Sreejith

(10) Patent No.: US 12,340,558 B2
(45) Date of Patent: Jun. 24, 2025

(54) ANOMALY DETECTION USING AUGMENTED REALITY (AR) AND ARTIFICIAL INTELLIGENCE (AI)

(71) Applicant: The Boeing Company, Chicago, IL (US)

(72) Inventor: Sudha Sreejith, Bangalore (IN)

(73) Assignee: The Boeing Company, Arlington, VA (US)

( * ) Notice: Subject to any disclaimer, the term of this patent is extended or adjusted under 35 U.S.C. 154(b) by 502 days.

(21) Appl. No.: 17/716,863

(22) Filed: Apr. 8, 2022

(65) Prior Publication Data

US 2023/0021676 A1     Jan. 26, 2023

(30) Foreign Application Priority Data

Jul. 22, 2021    (IN) ............................ 202111032984

(51) Int. Cl.
*G06V 10/764*    (2022.01)
*G06V 30/19*    (2022.01)

(52) U.S. Cl.
CPC ...... *G06V 10/764* (2022.01); *G06V 30/19127* (2022.01)

(58) Field of Classification Search
CPC .................. G06V 10/764; G06V 10/82; G06V 30/19127; G06V 2201/06; G06V 20/20
See application file for complete search history.

(56) References Cited

U.S. PATENT DOCUMENTS

| | | | |
|---|---|---|---|
| 7,493,826 B2 | 2/2009 | Bohr et al. | |
| 7,936,285 B2 | 5/2011 | Kneller et al. | |
| 9,019,128 B1 | 4/2015 | Kim | |
| 9,310,800 B1 | 4/2016 | Datcher et al. | |
| 2006/0008114 A1* | 1/2006 | Sekiguchi | H04N 1/00331 358/1.14 |
| 2010/0195151 A1* | 8/2010 | Fukuda | H04N 1/00204 358/1.18 |

(Continued)

OTHER PUBLICATIONS

Banerjee, A. et al., "A Support Vector Method for Anomaly Detection in Hyperspectral Imagery", IEEE Transactions on Geoscience and Remote Sensing, vol. 44, No. 8, Aug. 2006 (10 pages).

*Primary Examiner* — John B Strege
(74) *Attorney, Agent, or Firm* — Alleman Hall & Tuttle LLP

(57) ABSTRACT

A method including taking, with a camera, an image of a physical object. The method also includes processing the image by converting the image into a vector data file. Processing the image also includes inputting the vector data file to a trained machine learning model artificial intelligence (AI). Processing the image also includes executing the AI to produce an output including a classification of an anomaly in the image. Processing the image also includes converting the output into a reconfigured output including a data format configured for use with augmented reality (AR) hardware. The method also includes transmitting the reconfigured output to the AR hardware. The method also includes displaying, using the reconfigured output, the physical object on a display device of the AR hardware. The method also includes highlighting, on the display device concurrently with displaying the physical object, the anomaly.

20 Claims, 14 Drawing Sheets

(56) References Cited

U.S. PATENT DOCUMENTS

| | | | |
|---|---|---|---|
| 2011/0229045 A1* | 9/2011 | Yu ........................... | G06V 20/10 |
| | | | 382/224 |
| 2018/0165978 A1 | 6/2018 | Wood et al. | |
| 2018/0342054 A1* | 11/2018 | Wagstaff .................. | G06N 3/08 |
| 2020/0042838 A1* | 2/2020 | Trim ..................... | G06F 16/583 |
| 2020/0250496 A1* | 8/2020 | Najarian .............. | G06V 10/764 |
| 2020/0320769 A1* | 10/2020 | Chen ..................... | G06F 18/214 |
| 2021/0174145 A1* | 6/2021 | Buibas ................. | G06V 10/774 |
| 2021/0327041 A1* | 10/2021 | Asendorf ............... | G07D 7/206 |
| 2021/0342652 A1* | 11/2021 | Glassman ............. | G06F 18/251 |
| 2022/0318672 A1* | 10/2022 | Qu ........................... | G06N 5/04 |
| 2022/0383128 A1* | 12/2022 | Gonzales ................ | G06V 10/82 |
| 2024/0169758 A1* | 5/2024 | Huang ................. | G06V 10/761 |

* cited by examiner

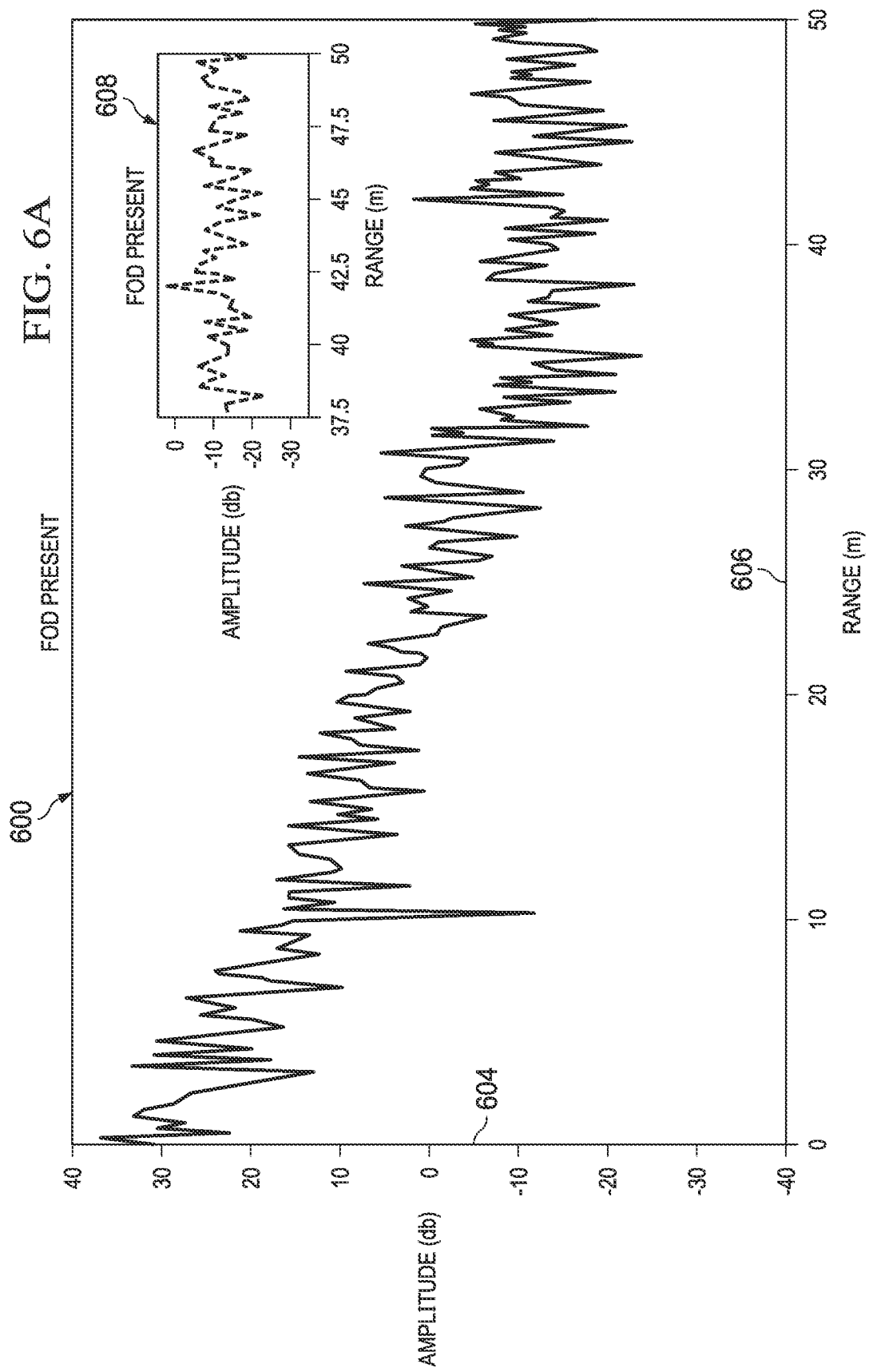

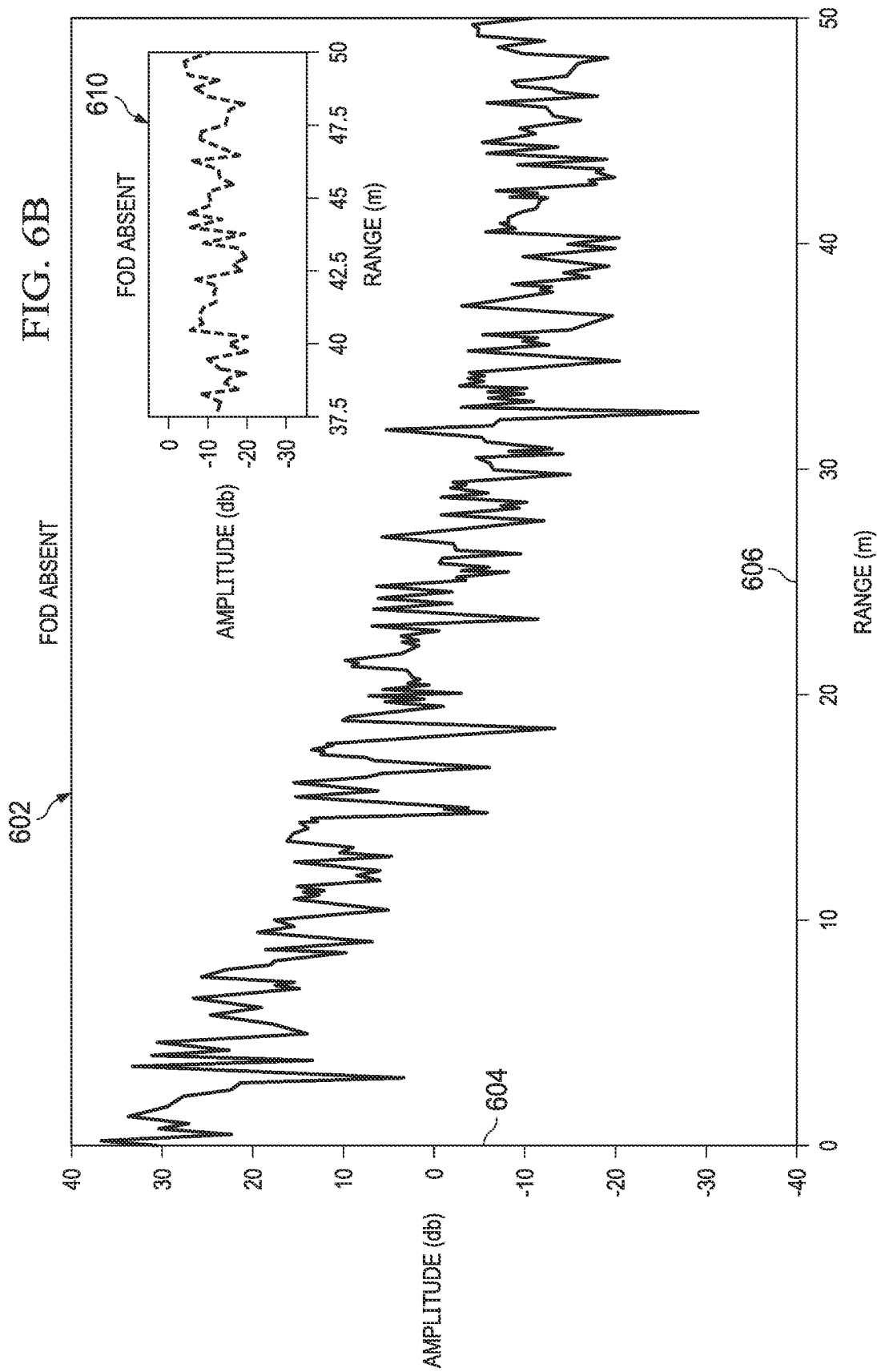

ANOMALY DETECTION USING AUGMENTED REALITY (AR) AND ARTIFICIAL INTELLIGENCE (AI)

CROSS-REFERENCE TO RELATED APPLICATION

This application claims benefit under 35 U.S.C. § 119 to Indian Patent Application No. 202111032984, filed on Jul. 22, 2021, having the same inventor, and entitled "ANOMALY DETECTION USING AUGMENTED REALITY (AR) AND ARTIFICIAL INTELLIGENCE (AI)." Indian Patent Application No. 202111032984 is incorporated herein by reference in its entirety.

BACKGROUND

Equipment manufacturers and equipment operators are interested in ensuring that products are within pre-determined engineering tolerances. A significant challenge to satisfying pre-determined engineering tolerances is detecting anomalies in the equipment.

An anomaly is any physically measurable aspect of equipment that lies outside at least one engineering tolerance, or is a missing aspect of equipment that should be present. Examples of anomalies include foreign object debris (FOD) (such as trash, animals, loose parts, etc.), an inconsistency (an out-of-tolerance area on a product), a missing component (such as an expected connector being missing), and the like.

To highlight the challenge, an aircraft manufacturer or an aircraft operator seeks to ensure that a modern passenger jet is, and remains, within all pre-determined engineering tolerances. However, a modern passenger jet may have several million different parts. The relatively large number of parts and the ongoing inspection requirements of the aircraft increase the difficulty of detecting anomalies in the aircraft.

SUMMARY

The one or more embodiments provide for a method. The method includes taking, with a camera, an image of a physical object. The method also includes processing the image by converting the image into a vector data file. Processing the image also includes inputting the vector data file to a trained machine learning model artificial intelligence (AI). Processing the image also includes executing the AI to produce an output including a classification of an anomaly in the image. Processing the image also includes converting the output into a reconfigured output including a data format configured for use with augmented reality (AR) hardware. The method also includes transmitting the reconfigured output to the AR hardware. The method also includes displaying, using the reconfigured output, the physical object on a display device of the AR hardware. The method also includes highlighting, on the display device concurrently with displaying the physical object, the anomaly.

The one or more embodiments also provide for a system. The system includes augmented reality (AR) hardware including a processor, a display device in communication with the processor, and a camera in communication with the processor. The system also includes a data repository including a non-transitory computer readable storage medium in communication with the AR hardware. The non-transitory computer readable storage medium stores a machine learning model artificial intelligence (AI) trained, on a training data set including images having corresponding known anomalies, to detect the corresponding known anomalies in the images. The non-transitory computer readable storage medium also stores an image of an unknown object. The non-transitory computer readable storage medium also stores a classification, output by the AI, of the unknown object, the classification including one of an anomaly being present and the anomaly being absent. The anomaly is one of the corresponding known anomalies. The non-transitory computer readable storage medium also stores computer readable program code. The computer readable program code is executable to cause the AI to take, as input, the image of the unknown object, and to output the classification. The computer readable program code also includes a data conversion application executable to convert the output to an AR input for the AR hardware. The computer readable program code also includes an AR services application executable to display the image of the unknown object on the display device and further to highlight the anomaly on the display device, when the anomaly is present.

A non-transitory computer readable storage medium storing program code which, when executed by a processor, performs a computer-implemented method. The computer-implemented method includes taking, with a camera, an image of a physical object. The computer-implemented method also includes processing the image by converting the image into a vector data file. The image is also processed by inputting the vector data file to a trained machine learning model artificial intelligence (AI). The image is also processed by executing the AI to produce an output including a classification of an anomaly in the image. The image is also processed by converting the output into a reconfigured output including a data format configured for use with augmented reality (AR) hardware. The computer-implemented method also includes transmitting the reconfigured output to the AR hardware. The computer-implemented method also includes displaying, using the reconfigured output, the physical object on a display device of the AR hardware. The computer-implemented method also includes highlighting, on the display device concurrently with displaying the physical object, the anomaly.

Other aspects of the one or more embodiments will be apparent from the following description and the appended claims.

BRIEF DESCRIPTION OF DRAWINGS

FIG. 6A and FIG. 6B are graphs of test results of using an artificial intelligence algorithm to detect the presence of a foreign object debris anomaly, in accordance with one or more embodiments.

DETAILED DESCRIPTION

Figure 1A:
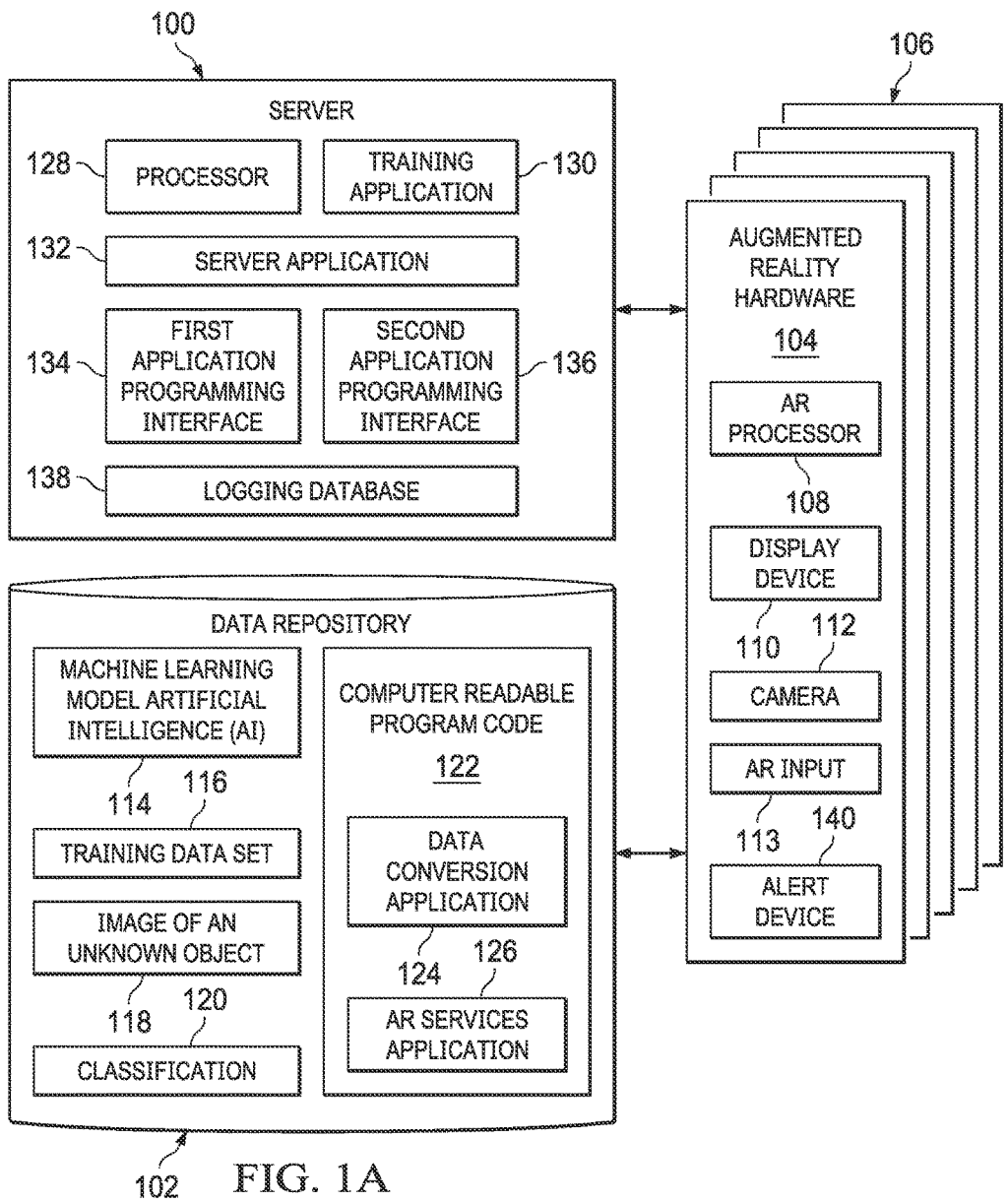
FIG. 1A shows a computing system, in accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or a removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, the one or more embodiments relate to the detection of anomalies in objects using a combination of AI and AR. As used herein, the term "AI" refers to "artificial intelligence." "Artificial intelligence" is a term referring to one or more machine learning algorithms, plus possibly supporting computerized heuristics, as described further below. As used herein, the term "AR" refers to "augmented reality." "Augmented reality" is a term referring to systems and methods for projecting a computer-generated image onto a live or recorded image or video stream.

A technical challenge exists in using AI with AR. In particular, the output of an AI with respect to a single item being predicted or classified usually takes the form of a single number that represents a probability that the single item belongs to a class, or has a particular property which the machine learning model has been trained to detect. An AI algorithm may also output a vector for a variety of properties being classified. As used herein a "vector" is a data structure. Unless stated otherwise, a vector takes the form of a one dimensional array of numbers. In other cases an AI algorithm may also output a multi-dimensional vector (a vector having more than one dimension). However, the AI ultimately outputs a number or numbers that represent a probability.

An AR system, in contrast, projects computer-generated graphics onto a live or recorded image or video stream. For example, a user may take an image of an object with the camera of a mobile phone, and the AR system projects a computer generated image of a real component to be attached to the object. In a specific example, a computer generated image of a bolt and nut assembly may be projected onto a live video image of a threaded hole where the bolt is to be installed. The AR may also display computer-generated instructions that are projected onto the live image of the object with the threaded hole. The instructions inform a user regarding how to perform the connection procedure using a real bolt and nut, or provide cautions that the users understand.

Thus, AR and AI are entirely different computing systems. The probability produced by an AI is not computer instructions for projecting an image onto a screen in an AR system. Thus, the output of an AI is not compatible for use with an AR system. The one or more embodiments address this and other technical challenges so that an AI can identify an anomaly in or on an object, and then an AR system can highlight the detected anomaly in the live image or video displayed on a display device. Thus, the one or more embodiments enable users to more rapidly and more accurately identify anomalies in or on objects.

Figure 1B:
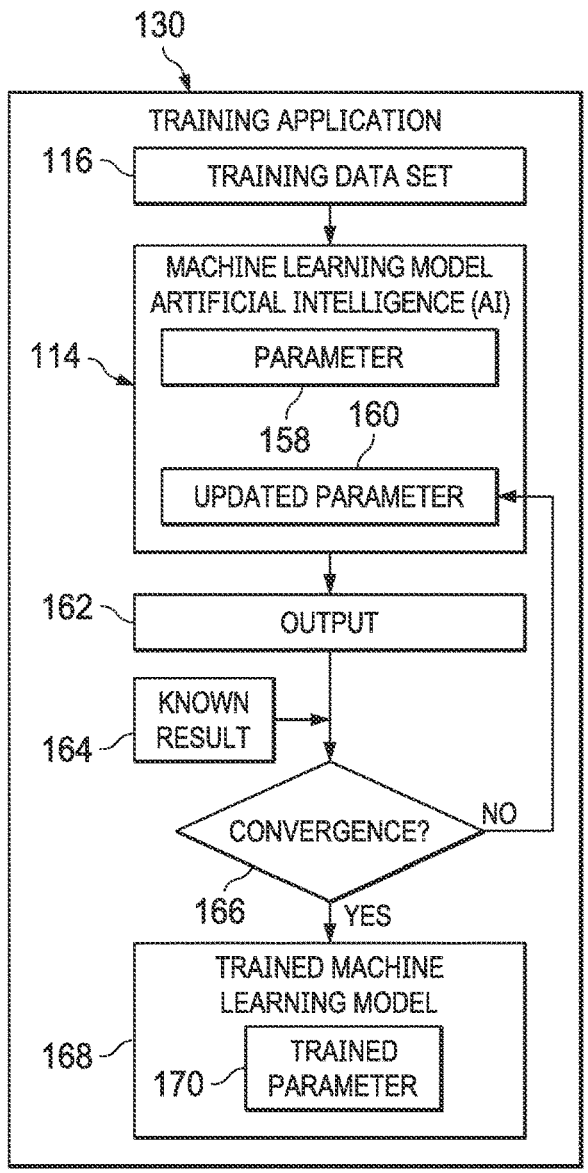
FIG. 1B shows a training application for a machine learning model, in accordance with one or more embodiments.
Figure 1C:
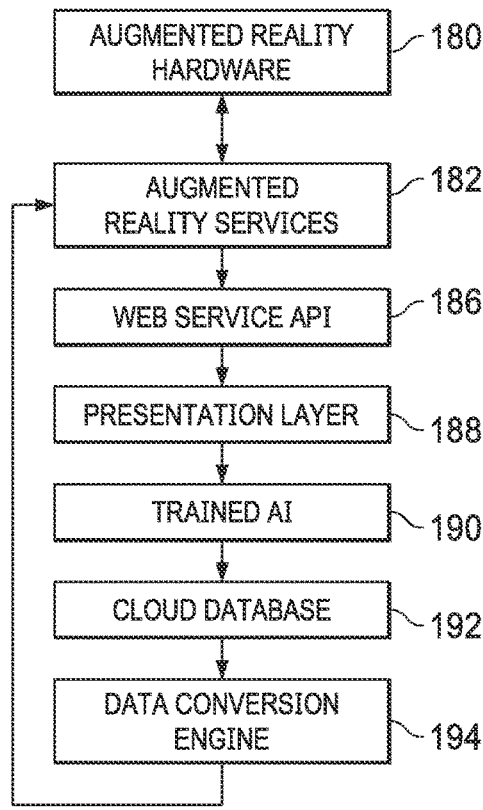
FIG. 1C shows an architecture for supporting the detection of anomalies using a combination of artificial intelligence and augmented reality, in accordance with one or more embodiments.

Attention is now turned to the figures. FIG. 1A through FIG. 1C show a computing system, training application, and an architecture for supporting the detection of anomalies using a combination of artificial intelligence and augmented reality, in accordance with one or more embodiments. The systems shown in FIG. 1 may be implemented using the computing system and network shown in FIG. 8A and FIG. 8B.

The system shown in FIG. 1A includes a server (100), a data repository (102), and augmented reality hardware (104), which may include multiple components as indicated by arrow (106). The multiple components may include a camera, a display device, a mobile computer, and possibly additional components as indicated below.

The augmented reality hardware (104) at least includes an AR processor (108). The AR processor (108) may include multiple processors, such as a central processing unit (CPU) and/or a graphics processing unit (GPU). The AR processor (108) executes the computer instructions that generate a computer generated image and cause the computer generated image to be projected onto the real recorded or live image or video stream on a display device (110). The display device (110) is in communication with the AR processor (108), which may be a wired or wireless communication as the display device (110) and the AR processor (108) need not be physically present on the same device.

The augmented reality hardware (104) also includes a camera (112). The camera (112) likewise is in communication with the AR processor (108) and possibly is in communication with the display device (110). The camera (112) also need not be part of the same device that houses the AR processor (108) and/or the display device (110). For example, the camera (112) may be a flexible fiber that communicates via wired and/or wireless communications with the AR processor (108).

However, in an embodiment, the AR processor (108), the display device (110), and the camera (112) are all part of the same device. For example, the augmented reality hardware (104) may all be housed in a single mobile phone or laptop computer.

Other variations are contemplated. For example, the augmented reality hardware (104) may include video glasses; a mobile phone; a laptop computer; a camera embedded in the video glasses, the mobile phone, or the laptop computer; a fiber optic cable connected to the camera and to the video glasses, the mobile phone, or the laptop computer; and combinations thereof. The one or more embodiments are not necessarily limited to the list of AR hardware listed above.

The augmented reality hardware (104) also uses AR input (113). The AR input (113) is data and/or program code that enables the augmented reality hardware (104) to highlight an anomaly when the AI (114) detects that the anomaly is present in the image of an unknown object (118). Generation of the AR input (113) is described with respect to FIG. 2A through FIG. 2F. The AR input (113) may be generated by the server (100), or in some cases may be generated locally by the augmented reality hardware (104).

The arrow (106) also may include an alert device (140). The alert device (140) is configured to transmit an alert to a remote facility when the anomaly is detected. The remote facility may be the server (100), the data repository (102), or some other facility or computer of an entity charged with monitoring the inspection of an object. Alternatively, the alert device (140) may be an audio, visual, or haptic generation device, that is part of the augmented reality hardware (104), that informs a user when an anomaly has been highlighted.

Attention is now turned to the data repository (102). The data repository (102) is a non-transitory computer readable storage medium, an example of which is described with respect to FIG. 8A and FIG. 8B. The data repository (102) stores programs and data useful for accomplishing the one or more procedures described with respect to FIG. 2A through FIG. 2F.

The data repository (102) is in communication with the augmented reality hardware (104). The communication channel may be a wired or wireless connection. The data repository (102) may be part of the same device that forms the augmented reality hardware (104), though in other embodiments some or all of the programs and/or data loaded on the data repository (102) are stored remotely and/or on the server (100).

The server (100) stores a machine learning model artificial intelligence (AI) (114), which may also be referred to more simply as the AI (114). As indicated above, the term "AI" refers to "artificial intelligence." "Artificial intelligence" is a term referring to one or more machine learning algorithms, plus possibly additional computerized heuristics or programmed rules which may operate to either pre-process data input to the machine learning model or post-process data output from the machine learning model. Note that the term "machine learning algorithm" is synonymous with the term "machine learning model." From the above, the term "machine learning model artificial intelligence" refers to at least one machine learning model and possibly additional computerized heuristics or programmed rules that pre-process data prior to input or post-process data after output from the one or more machine learning models.

The AI (114) may include one or more different types of machine learning models. One example of the AI (114) is a model known as a particle swarm optimization (PSO) support vector data description (SVDD) model, or PSO-SVDD model. However, the AI (114) also may be or may include a neural network, a k-type classifier, or some other classification machine learning model.

Prior to use, the AI (114) is deemed "untrained". Training a machine learning model is a process of priming an AI (114) for a particular application. The process of training the AI (114) is described with respect to FIG. 1B. After training, the AI (114) is a "trained model" or a "trained AI". In the one or more embodiments, the AI (114) is trained on a training data set (116) including images having corresponding known anomalies. In particular, the AI (114) is trained to detect known anomalies in the images.

The training data set (116) is data, in this case still or video images, of one or more objects. Some of the images contain one or more anomalies; others do not. However, in each case, the computer programmer knows which images contain one or more anomalies, and which do not. Once the AI (114) is executed on the training data set (116), the prediction output by the AI (114) is compared by the computer to the known results. The differences between the known results and the prediction is then used to modify the machine learning model. The process, known as training, is iterated until convergence, as described further below.

The process of training a machine learning model changes the model. Thus, it is proper to refer to a trained machine learning model as being different than the untrained machine learning model. In other words, the training process described with respect to FIG. 1B results in a fundamentally different machine learning model relative to training the machine learning model using some other training process or some other training data set. The outputs of differently trained machine learning models are different, because the underlying trained machine learning models are different.

The data repository (102) stores additional information. For example, the data repository (102) also stores an image of an unknown object (118). The image of unknown object (118) is either a still picture or a video of an object for which the computer has not yet made an automated prediction whether an anomaly exists with respect to the object. Thus, the image was not included in the training data set (116), or was withheld from the training data set (116) during training, and may or may not contain an anomaly.

The data repository (102) also stores a classification (120). The classification (120) is the output of the AI (114) when an image is analyzed by the AI (114). The classification (120) is a binary classification of the object as either having an anomaly present or an anomaly absent. Thus, the classification (120) of the image of an unknown object (118) is a probability that the image of an unknown object (118) contains an anomaly. The classification (120) of the training data set (116) during training is probabilities that the known images contain anomalies. Note that, during training, because the anomalies are known to exist in certain images, such anomalies may be referred to as known anomalies.

The data repository (102) also stores computer readable program code (122). The computer readable program code (122) is machine-readable code that a processer can execute on input in order to produce an output. The computer readable program code (122) can take the form of a variety of programming languages, such as C++, Python, JAVA®, and the like.

The computer readable program code (122) is described with respect to the function that the computer readable program code (122) performs. Thus, the computer readable program code (122) can be described as the computerized implementation of the methods described with respect to FIG. 2A through FIG. 2F. As an example, the computer readable program code (122) may be executable to cause the AI to take, as input, the image of the unknown object, and to output the classification.

The computer readable program code (122) may also take the form of an application or a suite of applications. For example, the computer readable program code (122) includes a data conversion application (124). The data conversion application (124) is executable to convert the output of the AI to an AR input for the AR hardware, as described with respect to FIG. 2A through FIG. 2F.

The computer readable program code (122) also includes an AR services application (126). The AR services application (126) is executable to display the image of the unknown object on the display device and further to highlight the anomaly on the display device, when the anomaly is present, as described with respect to FIG. 2A through FIG. 2F.

Variations are possible. For example, the data repository (102) also may include a database of expected outputs of the AI (114). In this case, the computer readable program code (122) may be executable to compare the classification to the expected outputs, to identify a difference between the classification and the expected outputs, and identify a portion of the image associated with the difference. The portion of the image is the AR input.

Attention is now turned to the server (100). In the one or more embodiments, the server (100) is a remote computer or remote server that is physically separated from the augmented reality hardware (104). However, the server (100) is in communication with the augmented reality hardware (104). The data repository (102) may be part of the server (100), or may be remote from the server (100).

The server (100) includes a processor (128). The processor (128) is one or more logical or hardware processing units that execute the AI (114) and/or the computer readable program code (122). Examples of the processor (128) are described with respect to FIG. 8A and FIG. 8B.

A number of applications may be stored and executed by the server (100), in addition to those stored on the data repository (102). For example, the server (100) may include a training application (130) and a server application (132). The training application (130) is program code for training the AI (114). An example of the training application (130) is described with respect to FIG. 1B. The server application (132) is program code for executing the AI (114).

The server (100) also may store a first application programming interface (134) and a second application programming interface (136). In general, an application programming interface (API) is a computing interface that defines interactions between multiple software applications or mixed hardware-software intermediaries. The API defines the types of calls or requests that can be made, how to make them, the data formats that are to be used, the conventions to follow, and the like. The API may provide extension mechanisms to extend existing functionality of an application. Thus, an API is one technique to enable modular programming.

The first application programming interface (134) is configured to transmit the image of an unknown object (118) to the server (100). The first application programming interface (134) may be instantiated in the augmented reality hardware (104) in some instances. The second application programming interface (136) is configured to transmit the AR input (113) from the remote server to the AR hardware. The server (100) may generate the AR input (113), though in some cases the AR input (113) may be generated locally at the arrow (106).

The server (100) also includes a logging database (138), though the logging database (138) may be stored on the data repository (102) in some cases. The logging database (138) stores an anomaly that is detected. The logging database (138) may also store the image that contains the anomaly, or may store the image highlighted to show the anomaly clearly. The logging database (138) is useful to generate additional data to expand the training data set (116). The expanded training data set (116) can later be used to re-train the AI (114) and thereby further improve the performance of the AI (114) when predicting the absence or presence of anomalies.

Attention is now turned to FIG. 1B. FIG. 1B shows details of the training application (130) mentioned with respect to FIG. 1A. The training application (130) causes the training data set (116) to be provided as input to the machine learning model artificial intelligence (AI) (114). As indicated above, the machine learning model artificial intelligence (AI) (114) is a classification algorithm. The machine learning model artificial intelligence (AI) (114) is characterized by a parameter (158). The parameter (158) modifies how the machine learning model artificial intelligence (AI) (114) performs the algorithm on the training data set (116). Thus, even if the training data set (116) does not change, changing the parameter (158) changes the output (162) of the machine learning model artificial intelligence (AI) (114).

Depending on the type of machine learning model artificial intelligence (AI) (114), the parameter (158) may be representative of many different parameters. In other words, although the singular term "parameter" is used with respect to FIG. 1C, the parameter (158) also may refer to multiple different parameters in the plural sense.

The details of the parameter (158) depend on the exact type of the machine learning model artificial intelligence (AI) (114). As an example, the parameter (158) may take the form of model parameters. Model parameters are the parameters in the machine learning model artificial intelligence (AI) (114) that are determined using the training data set (116). An example of model parameters is the weights that are defined for a regression machine learning model. An example of model parameters of a support vector data description algorithm (SVDD) is known as "factor C" and one or more "kernel parameters." Other details of a SVDD classifier are provided below with respect to FIG. 5 through FIG. 6A.

The parameter (158) may also take the form of hyperparameters. Hyperparameters are tuned during the training process in order to obtain a model with a desired degree of performance. Examples of hyperparameters include a number of iterations for a perceptron classifier or an inverse of regularization strength in a logistic regression classifier.

In some cases, the computer scientist sets the initial value(s) of the parameter (158). The training application (130) causes the training data set (116) to be provided to the machine learning model artificial intelligence (AI) (114), which is then executed a first time to generate the output (162).

The output (162) is then compared to a known result (164). The known result (164) is already known because the computer scientist already knows how the training data set (116) is classified, or otherwise already knows what the output (162) is when the machine learning model artificial intelligence (AI) (114) is executed taking the training data set (116) as input. For example, the known result (164) may be the known presence or absence of an anomaly in images in the training data set (116).

The output (162) is compared to the known result (164) to determine whether a convergence (166) has occurred. Convergence is defined as the output (162) being within a predetermined degree of match of the known result (164). The predetermined degree of match may also be referred to as a threshold degree of match.

If the convergence (166) does not occur, then the training application (130) will continue with training. The training application (130) and/or the computer scientist guesses at or calculates an updated parameter (160). The updated parameter (160) is one or more of the parameter (158) that have been modified. Because the updated parameter (160) is changed, the machine learning model artificial intelligence (AI) (114) is changed.

In other words, the updated parameter (160) changes the machine learning model artificial intelligence (AI) (114) into a new and different machine learning model artificial intelligence (AI) (114). While the machine learning model artificial intelligence (AI) (114) is of the same type using either the parameter (158) or the updated parameter (160), the machine learning model artificial intelligence (AI) (114) is nevertheless changed, updated, and/or transformed from the prior state of the machine learning model artificial intelligence (AI) (114).

Additionally, the nature of the training data set (116) affects the training process and thus impacts how the machine learning model artificial intelligence (AI) (114) is updated or transformed. Training data related to different subject matter will change how the updated parameter (160) is determined, because the updated parameter (160) for one type of the training data set (116) will be different than the updated parameter (160) for another type of training data in order to better achieve the convergence (166) for the particular set of the training data set (116). Stated differently, the type of the training data set (116) changes the updated parameter (160) during the training process, and thus also changes the machine learning model artificial intelligence (AI) (114).

Once the convergence (166) has occurred, then the machine learning model artificial intelligence (AI) (114) is considered trained. Thus, the trained machine learning model (168) is defined as the machine learning model artificial intelligence (AI) (114) having a trained parameter (170). The trained parameter (170) is an optimized version of the updated parameter (160). The trained parameter (170) may represent multiple different parameters. The updated parameter (160) is considered optimized when the convergence (166) occurs.

Attention is now turned to FIG. 1C. FIG. 1C is a specific example of a system for combining an AI and AR to highlight anomalies in the display of a real object on a display device. The system shown in FIG. 1C is an implementation of the system shown in FIG. 1A.

The system shown in FIG. 1C includes AR hardware (180). The AR hardware (180) may be the augmented reality hardware (104) described with respect to FIG. 1A, and specifically includes a display device, an AR processor, and a camera that takes images of an object.

The AR hardware (180) uploads an image to AR services (182). The AR services (182) is one or more software applications or hardware implementations that allow communication between a trained AI (190) and the AR hardware (180). For example, the AR services (182) may include one or more application programming interfaces (APIs) that facilitate the transfer of a still image or a video stream to a remote server.

After the trained AI (190) has classified the presence of an anomaly, the AR services (182) may also include graphics rendering services for rendering highlighting, highlighting drawing services for drawing highlights on the image. The AR services (182) also may collect information about an anomaly using a UNITY® canvas.

In turn, the AR services (182) may output a received image from the AR hardware (180) to a web service API (186). The web service API (186) is one or more application programming interfaces that facilitate the transmission of information from the AR services (182) to a presentation layer (188), described below.

The presentation layer (188) is one or more applications that pre-process the image received from the web service API (186). Specifically, the presentation layer (188) converts the received image data into a form consumable by the trained AI (190), such as an input data vector.

The trained AI (190) is a PSO-SVDD (particle swarm optimization-support vector data description) classifier that has been trained to detect a variety of different anomalies using the system of FIG. 1B. The output of the trained AI (190) is a prediction of whether an anomaly is present or absent. The location of the anomaly is determined based on where, in the image, the prediction of an anomaly occurred.

The location is then passed to a target management system. The target is the anomaly. An example of a target management system is VUFORIA® Target Management System Web Tools. The target management system tracks targets and establishes a coordinate system for where, in the image, the classified anomalies are found. In this manner, the output of the trained AI (190) is in a format better suited for presentation to the AR hardware (180).

The output of the trained AI (190) is then passed to a cloud database (192). The cloud database (192) stores the output of the trained AI (190).

The stored output of the trained AI (190) is then presented to a data conversion engine (194). The data conversion engine (194) converts the trained AI (190) into a format immediately consumable by the AR hardware (180). The data conversion engine (194) may, in some cases, be part of the trained AI (190), but may also be a separate program, or may be part of the AR services (182).

As an example, the data conversion engine (194) may collect tag anomalies with screen identifiers, perform any scaling calculations to match the scale of the computer generated graphics that will form the highlighting of the anomaly, and perform other functions to convert the output of the trained AI (190) to a suitable input of the AR hardware (180). In a specific example, the conversion of the output of the trained AI (190) to the input to the AR hardware (180) is shown in FIG. 2B.

The data conversion engine (194) and/or the AR services (182) may perform other functions. For example, additional information may be added to the computer generated graphics that will be overlaid with the image on the display of the AR hardware (180). For example, the trained AI (190) may be trained to identify the probability of the existence of particular patterns of anomaly types. Patterns of anomaly types are shown in FIG. 6A and FIG. 6B. Based on the patterns, the data conversion engine (194) can consult additional databases to determine a likely type of anomaly detected. Thus, for example, not only does the AR hardware (180) identify and highlight the precise location of the anomaly on the image, but also may display instructions that indicate the type of anomaly and instructions for dealing with the anomaly.

In a high specific example, the anomaly is a loose screw in a moving part. The trained AI (190) identifies the loose screw as FOD (foreign object debris). The data conversion engine (194) converts the output of the trained AI (190) into a graphical overlay that circles the screw on the user's device and also displays text suggesting that a screw is loose and should be removed from the object.

While FIG. 1A through FIG. 1C show a configuration of components, other configurations may be used without departing from the scope of the one or more embodiments. For example, various components may be combined to create a single component. As another example, the functionality performed by a single component may be performed by two or more components.

Figure 8A:
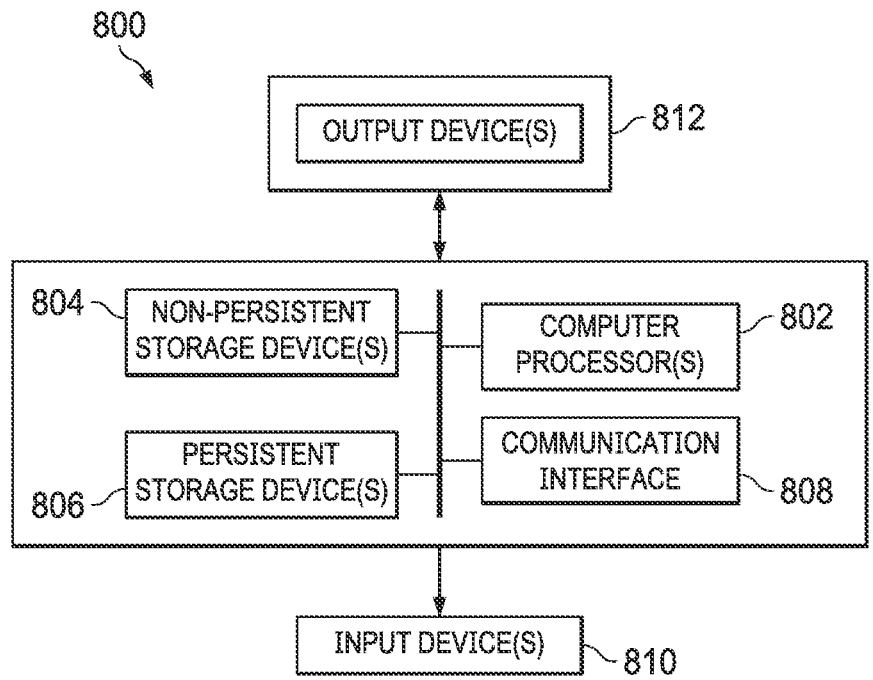
FIG. 8A and FIG. 8B show a computing and network system, in accordance with one or more embodiments.
Figure 8B:
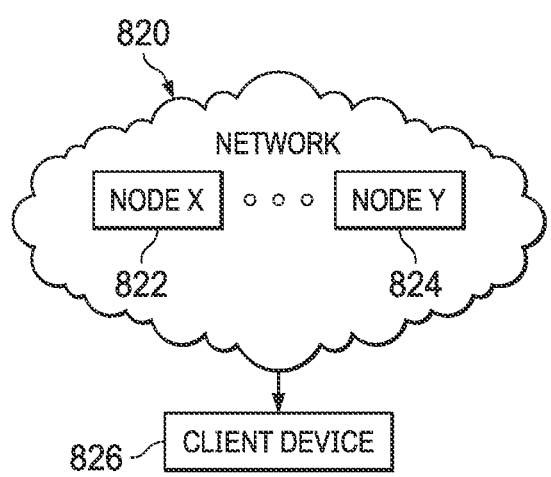

FIG. 2A through FIG. 2F are flowcharts, in accordance with one or more embodiments. The methods of FIG. 2A through FIG. 2F may be implemented using the systems in FIG. 1A through FIG. 1C. The methods of FIG. 2A through FIG. 2F are combined in some instances. For example, the method of FIG. 2B is an example of a procedure for implementing step 202 in FIG. 2A. The methods of FIG. 2A through FIG. 2F may be executed using a computing system and network, as shown in FIG. 8A and FIG. 8B.

Figure 2A:
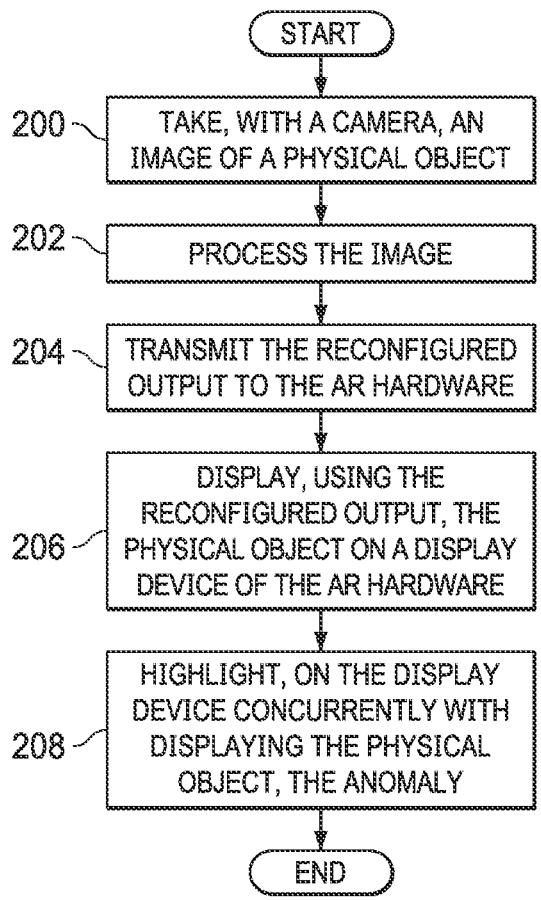
FIG. 2A, FIG. 2B, FIG. 2C, FIG. 2D, FIG. 2E, and FIG. 2F are methods for detecting anomalies in an object using a combination of artificial intelligence and augmented reality, in accordance with one or more embodiments.
Figure 2B:
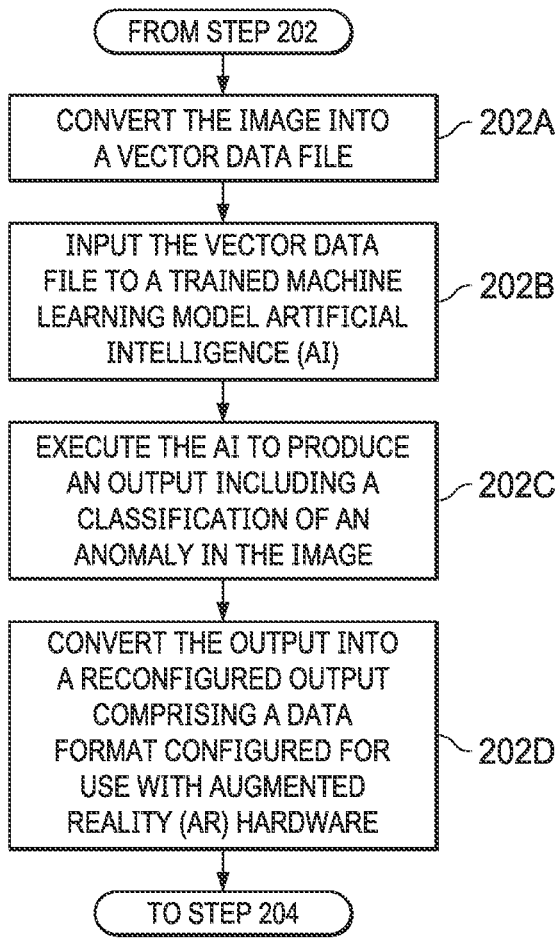

FIG. 2A is a method of combining AI and AR to highlight an anomaly on a display device. Step 200 includes taking, with a camera, an image of a physical object. The image, again, may be a still image or video, live or pre-recorded. The camera may be part of a computer (e.g. a mobile phone or laptop camera) or may be connected to the computer (e.g., a flexible fiber optic cable with the camera attached at the end or at one or more other points along the fiber). Thus, the image may be taken by placing a fiber into a space that is difficult to reach, may be taken simply by pointing a mobile phone at an object to be inspected, or by another convenient method of using the camera.

Step 202 includes processing the image. The image is processed by converting the image into a form consumable by a machine learning model (e.g., a vector). The machine learning model determines a probability of the existence of an anomaly. The output of the machine learning model is then converted into a format which can be used by augmented reality hardware. A specific example of a method for processing the image is described with respect to FIG. 2B.

Step 204 includes transmitting the reconfigured output to the AR hardware. Transmission may be accomplished using a computer bus, in the case that the AR hardware is part of the same computing device that includes the AI. Transmission may also be accomplished by wired or wireless communications, in the case that the AI is executed on a remote server, such as in FIG. 1C.

Step 206 includes displaying, using the reconfigured output, the physical object on a display device of the AR hardware. In other words, the image of the live or recorded object is displayed "as is" on the display device. However, step 208 includes highlighting, on the display device concurrently with displaying the physical object, the anomaly. The anomaly may be highlighted by circling the anomaly with a colored and/or dashed line, by pointing to the anomaly with an arrow, by an audio or haptic signal indicating the presence of the anomaly in the image, by some other highlighting scheme, or by combinations thereof.

In one embodiment, the process may terminate. However, as indicated above, sub-processes and/or additional processes may be performed. For example, FIG. 2B is a method for processing the image at step 202.

Step 202A includes converting the image into a vector data file. The conversion may be performed using an application that converts the pixel data in the image into a vector format, and in particular into a one dimensional data array. Thus, the format of the data of the image is physically changed from one form to another. Additional data may be added to the vector data file, such as metadata (e.g., time stamp, an identification of the object being identified, user data, etc.).

Step 202B includes inputting the vector data file to a trained machine learning model artificial intelligence (AI). Inputting may be accomplished as part of executing the AI, such as when the AI is instructed as to where the input vector may be found. Inputting may be accomplished by feeding the vector to the AI in order to trigger the AI to execute.

Step 202C includes executing the AI to produce an output including a classification of an anomaly in the image. The AI is executed according to the algorithm that defines the particular AI in question. Thus, the details of Step 202C depend on the particular machine learning model in question. However, a specific example of the use and training of a PSO-SVDD machine learning model is described with respect to FIG. 5 through FIG. 6B.

Step 202D includes converting the output into a reconfigured output having a data format configured for use with augmented reality (AR) hardware. The process of converting the output is described with respect to FIG. 2C. The process then continues to step 204 of FIG. 2A.

Figure 2C:
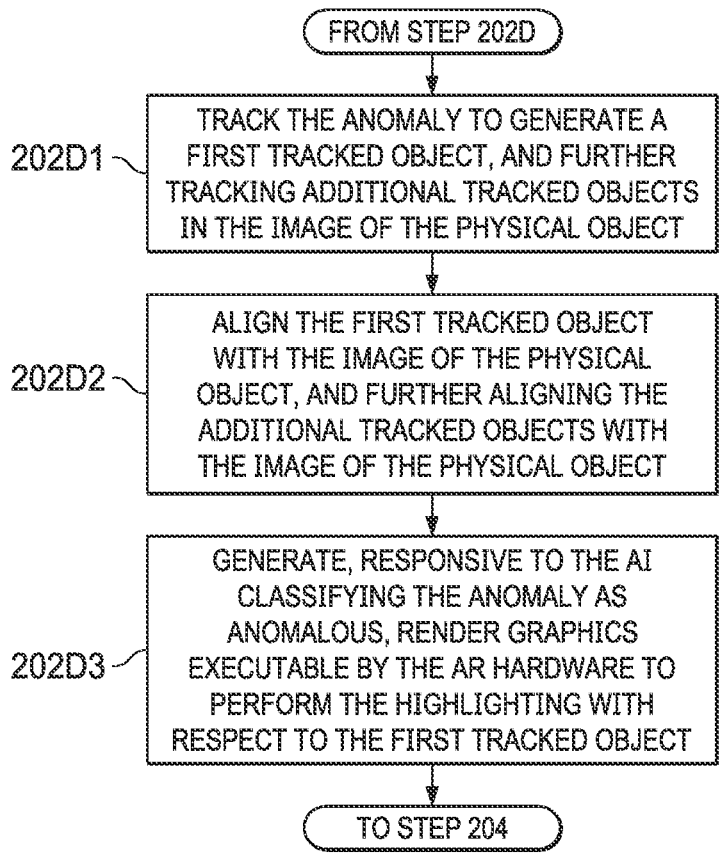

Thus, attention is now turned to FIG. 2C. FIG. 2C is a method for converting the output into a reconfigured output having a data format configured for use with the AR hardware, at step 202D of FIG. 2B.

Step 202D1 includes tracking the anomaly to generate a first tracked object, and further tracking additional tracked objects in the image of the physical object. Tracking of the first tracked object and the additional tracked objects may be accomplished using an image registration application. Step 202D2 includes aligning the first tracked object with the image of the physical object, and further aligning the additional tracked objects with the image of the physical object.

Again, aligning of the first tracked object and the additional tracked objects may be accomplished using the image registration application.

An example of an image registration application is VUFORIA®, though many image registration applications exist. Briefly, image registration identifies objects within the image, sets a scale and a coordinate system for the image, and tracks identified objects within that scale and coordinate system. The "first object" in this example is the anomaly. In the case of the video image, the position of the anomaly may change with the motion of the camera or the motion of the anomaly or the motion of the thing being inspected. Thus, the target (anomaly) is tracked within a coordinate system established for the image. Once tracked, the tracked objects are aligned with the image with respect to the coordinate system.

Step 202D3 includes generating, responsive to the AI classifying the anomaly as anomalous, render graphics executable by the AR hardware to perform the highlighting with respect to the first tracked object. In this example, the AI determines a probability above a pre-defined threshold that the first tracked object is an anomaly. The first tracked object is then marked with metadata to indicate that the first tracked object is anomalous.

At this point, highlighting can be generated using an AR application. In particular, previously generated special purpose code is executed to draw a circle around the first tracked object. In an even more specific example, the VUFORIA® SDK (software development kit) by PTC, Inc. can be used to develop the special purpose code to draw the circle, or other highlighting, around or near the first tracked object.

Note that a circle may be replaced by other types of highlighting, such as a shading over the object, text, an arrow, an audio or haptic warning, etc. Thus, the one or more embodiments are not necessarily limited to drawing circles around objects tracked by the AR that the AI has determined are likely anomalous.

The process then returns to step 204 of FIG. 2A. However, other variations or additions to the method of FIG. 2A through FIG. 2C are possible.

Figure 2D:
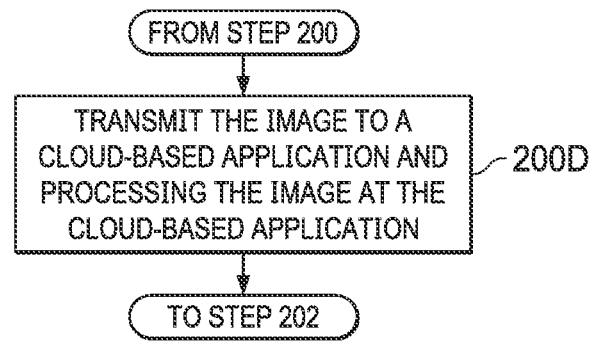

Thus, for example, attention is turned to FIG. 2D. FIG. 2D is an additional step that may be performed prior to processing the image at step 202 when the AI is a cloud-based service or other remote application on a remote server. Step 200D includes, prior to processing the image, transmitting the image to a cloud-based application and processing the image at the cloud-based application. Transmission may be performed by wired or wireless communications, and may be encrypted to improve data security.

Figure 2E:
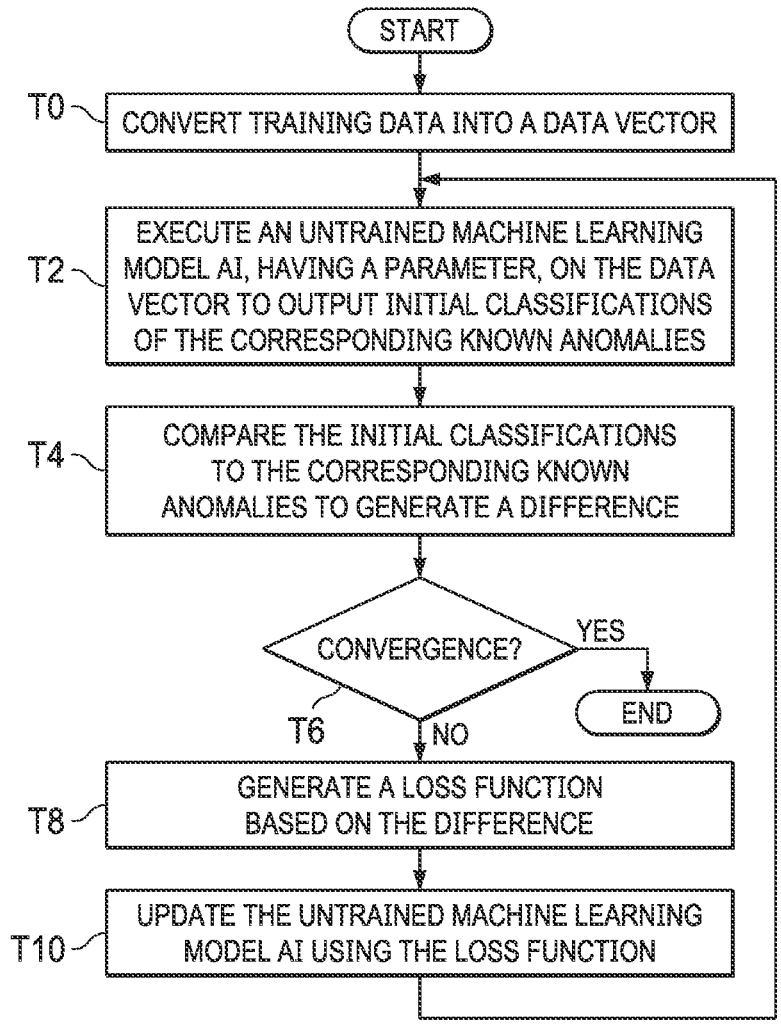

The method of FIG. 2A may also be extended by training the AI prior to processing the image at step 202 and possibly prior to taking the image at step 200. The steps of training the AI are shown in FIG. 2E. Thus, FIG. 2E is performed prior to step 202 of FIG. 2A.

Step TO includes converting training data into a data vector. The training data includes images of objects having a corresponding known anomalies. The data vector may be multiple data vectors in some embodiments. Some of the training data may be withheld from the data vector. The withheld data can be used to test a trained or partially trained machine learning model, because the machine learning model will treat the withheld data as unknown data, but the computer scientist still knows what the results of the withheld data should be. Conversion of the training data into a data vector may be performed by a vectorization application, such as vectorization.org, or other such applications.

Step T2 includes executing an untrained machine learning model AI, having a parameter, on the data vector to output initial classifications of the corresponding known anomalies. Executing is performed by running or executing the algorithm that forms the machine learning model AI, using the data vector as input. The output of the machine learning model AI is initial classifications of the corresponding known anomalies. The classifications take the form of probabilities that a tracked object is an anomaly. When a probability exceeds a threshold, the tracked object is deemed to represent an anomaly.

Step T4 includes comparing the initial classifications to the corresponding known anomalies to generate a difference. Because, in the training data, it is known which tracked objects are anomalies, the classifications produced by the machine learning model AI can be compared to the known results. A difference is generated. The difference represents a degree, on average, that the machine learning model AI correctly classified the tracked objects in the data vector as being anomalous or not anomalous. In other words, the difference may be reflected as a number which corresponds to the accuracy of the machine learning model AI.

Step T6 includes determining whether convergence has occurred. Convergence occurs when the comparison at step T4 is accurate to within a pre-determined degree of the known classifications. For example, if the machine learning model AI correctly predicted 95% all known anomalies, then convergence is deemed to have occurred.

The exact setting of convergence depends on a particular implementation, the selection of the machine learning model AI being used, and other factors. In some cases, convergence may occur after a pre-determined number, "N", iterations of the method shown in FIG. 2E, regardless of the accuracy of predicted results after "N" iterations.

If convergence has not occurred (a "no" determination at step T6), then the process continues to step T8. Step T8 includes generating a loss function based on the difference. The loss function is an evaluation of how the parameters of the machine learning model should be updated to improve the classification results. The loss function is generated by guessing, automatically and mathematically, how the parameters of the machine learning model AI should be changed. A specific example of how to calculate a loss function is described with respect to FIG. 2F, below.

Then, step T10 includes updating the untrained machine learning model AI using the loss function. Updating is performed by changing the parameters in a manner consistent with the loss function, or by applying the loss function to the parameters. The result of applying the loss function is the updated machine learning model AI.

The process then returns to step T2 and iterates by re-executing the machine learning model on the data vector. However, now the term "untrained" machine learning model AI may be replaced by the term "updated" machine learning model AI. The process thus iterates until convergence.

Returning to step T6, once convergence occurs (a "yes" determination at step T6), then the process terminates thereafter. At the termination of the process, the last iteration of the updated machine learning model AI is now considered the trained machine learning model AI.

Figure 2F:
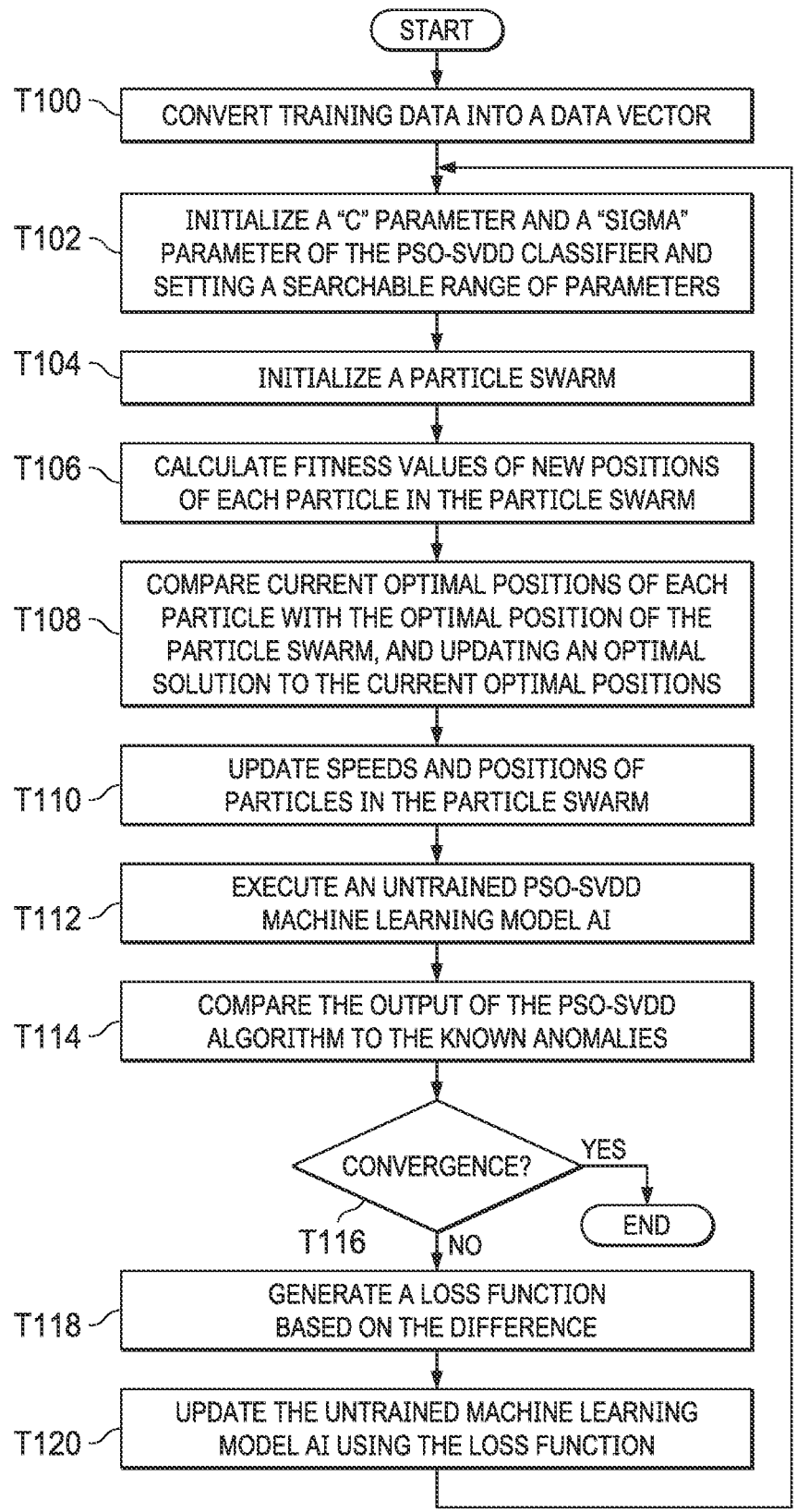

Attention is now turned to FIG. 2F. FIG. 2F is a specific example of training a machine learning model AI known as a particle swarm optimization support vector data description (PSO-SVDD) classifier. Thus, the method of FIG. 2F is a specific description of how to train a specific type of classifier to identify anomalies in a data vector formed from image data. Other methods for training different kinds of machine learning model AIs are also possible within the scope of the one or more embodiments, and thus the method of FIG. 2F does not necessarily limit the other examples described herein.

Step T100 includes converting training data into a data vector, wherein the training data includes images of objects having a corresponding known anomalies. Step T100 is similar to step TO of FIG. 2E.

Step T102 includes initializing a "C" parameter and a "sigma" parameter of the PSO-SVDD classifier and setting a searchable range of parameters. The parameters are set either by the user (e.g., a computer scientist) or automatically by a policy.

Step T104 includes initializing a particle swarm. Initializing the particle swarm may be performed by initializing a population size "W", a first acceleration constant, "C1", a second acceleration constant, "C2," an inertial weight "Iw", a maximum number of iterations, "It", a particle speed, "S", and a particle position, "P", determining an individual extreme of the particle position, "Pe", and an optimal position of the particle swarm, "Po". In this case, initializing "C", "sigma", the searchable range of parameters, "W", "C1", "C2", "Iw", "It", "S", "P", "Pe", and "Po" together establish the initial parameters for the PSO-SVDD classifier.

Step T106 includes calculating fitness values of new positions of each particle in the particle swarm. The fitness values are calculated as part of the PSO algorithm Step T108 includes comparing current optimal positions of each particle with the optimal position of the particle swarm, and updating an optimal solution to the current optimal positions. Step T108 is also part of the PSO algorithm. The term "optimal" refers to a mathematical maximization or minimization process. Step T110 includes updating speeds and positions of particles in the particle swarm. Updating the speeds and positions of the particles is also part of the PSO algorithm.

Step T112 includes executing an untrained PSO-SVDD machine learning model AI using the data vector as input. The initial parameters of the PSO-SVDD are set according to the steps T102 through T110. The PSO-SVDD algorithm is executed using one or more processors. The output of the PSO-SVDD algorithm is classifications of the corresponding known anomalies.

Step T114 includes comparing the output of the PSO-SVDD algorithm to the known anomalies to generate a difference. The comparison generates a measure of accuracy of the current iteration of the PSO-SVDD machine learning model AI with respect to classifying known anomalies in the images.

Step T116 includes determining whether convergence has occurred. Convergence occurs when the difference (i.e., the measure of accuracy) reaches a pre-determined accuracy, when the error rate is mathematically minimized, or when the maximum number of iterations have been reached. If convergence has not occurred (a "no" determination at step T116), then the process continues to step T118.

Step T118 includes generating a loss function based on the difference. Generating the loss function may include weighting the various parameters identified above based on the degree of difference, and/or by performing a mathematical optimization algorithm to estimate the impact a change to a particular combination of parameters will have on the output of the PSO-SVDD machine learning model AI. Thus, part of generating the loss function may include re-iterating steps T104 through T110 using weights to adjust the calculated fitness values and other parameters. Thus, particle fitness may be recalculated at each iteration of the method of FIG. 2F. Other techniques for calculating the loss function may also be used, such as regression losses or classification losses.

Step T120 includes updating the untrained machine learning model AI using the loss function. The PSO-SVDD machine learning model AI is updated by adjusting the parameters described above, and thus steps T104 through T112 are part of updating the PSO-SVDD machine learning model AI.

Thereafter, the method returns to step T102 and the process repeats until convergence. Upon convergence (a "yes" determination at step T116), the process terminates, and the latest version of the updated PSO-SVDD machine learning model AI is considered to be the trained PSO-SVDD machine learning model AI.

The methods of FIG. 2A through FIG. 2F may be further varied. For example, taking the image may include taking the image with a mobile phone in which the camera is installed, or taking the image remotely, wherein the camera includes a remote camera in communication with the display device. The anomaly may be selected from the group consisting of: foreign object debris (FOD), absence of an expected component, an inconsistency, an out-of-tolerance orientation of components, and combinations thereof. However, many different forms of anomalies may be identified using the methods described herein.

Additionally, while the various steps in the flowcharts are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

FIG. 3 through FIG. 7 present a specific example of the techniques described above with respect to FIG. 1 through FIG. 2F. The following example is for explanatory purposes only and not intended to limit the scope of the one or more embodiments.

Figure 3:
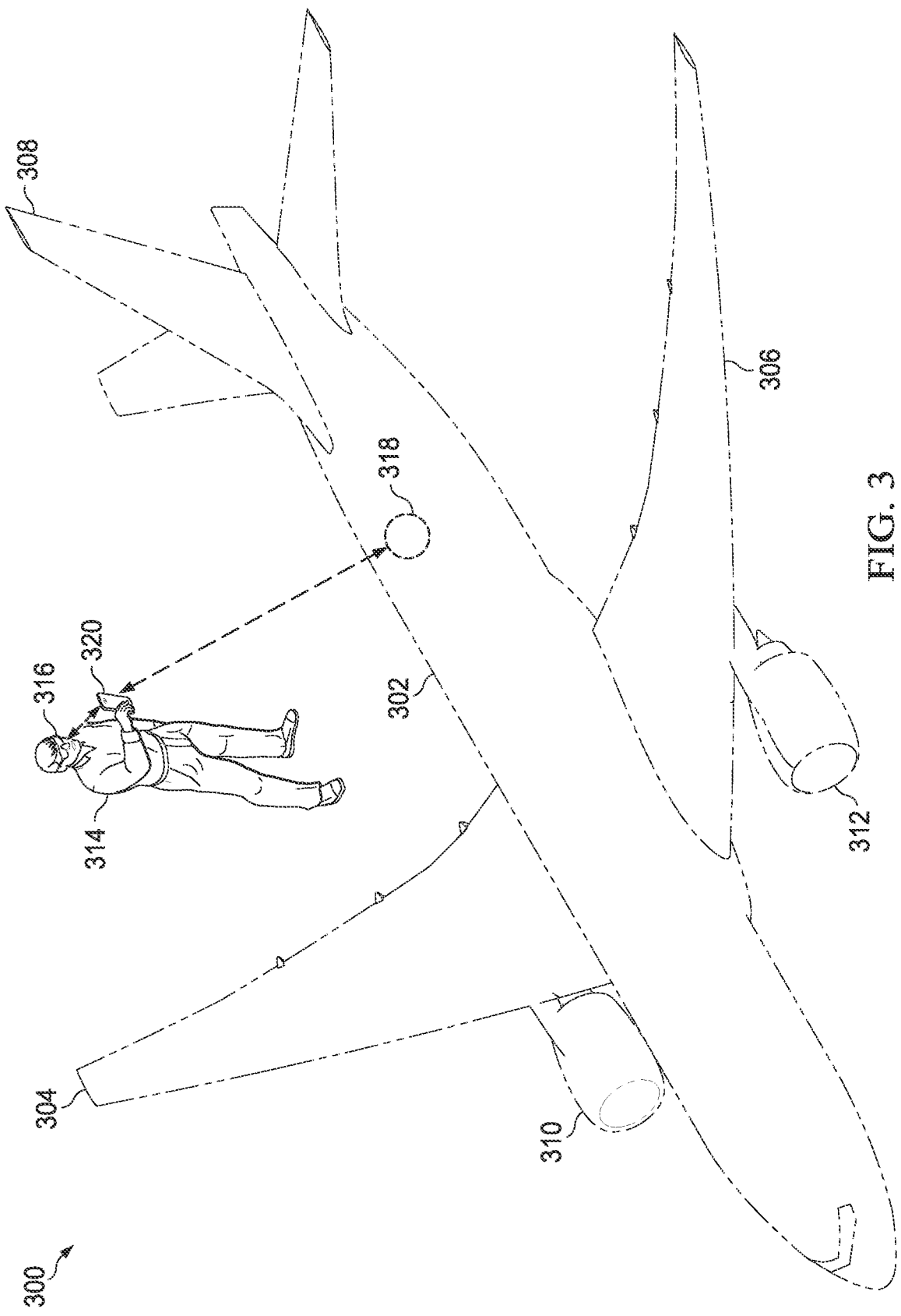
FIG. 3 is an example of an aircraft being inspected using an inspection system that includes a combination of artificial intelligence and augmented reality, in accordance with one or more embodiments.

FIG. 3 is an example of an aircraft being inspected using an inspection system that includes a combination of artificial intelligence and augmented reality, in accordance with one or more embodiments. The aircraft (300) includes a fuselage (302), a first wing (304), a second wing (306), and a tail (308). The aircraft (300) in one or more examples includes a propulsion system, such as first engine (310) and second engine (312). The aircraft (300) in one or more examples includes additional components, in addition to those described above.

In this example, a technician (314) (i.e., the user) is using AR glasses (316) to view an AR display that displays an image of an area (318) of the aircraft (300). The image is taken by a camera in a mobile phone (320) operated by the technician (314). The image, in this example, is a live video stream.

Note that the aircraft (300) shown in FIG. 3 is only one specific example of objects that may be inspected according to the techniques described herein. Other types of aircraft, machines, buildings, and many other objects may be so inspected using the one or more embodiments.

FIG. 4A, FIG. 4B, FIG. 4C, FIG. 4D, and FIG. 4E are examples of anomalies found using the inspection system of FIG. 3, in accordance with one or more embodiments. In each case, the anomaly is detected using a machine learning model AI that processes the live video feed, and the highlighting shown is a computer-generated graphic that is added to the display of the live video feed. The examples of FIG. 4A through FIG. 4E are only examples, as many different kinds of anomalies may be detected and highlighted using the one or more embodiments.

Figure 4A:
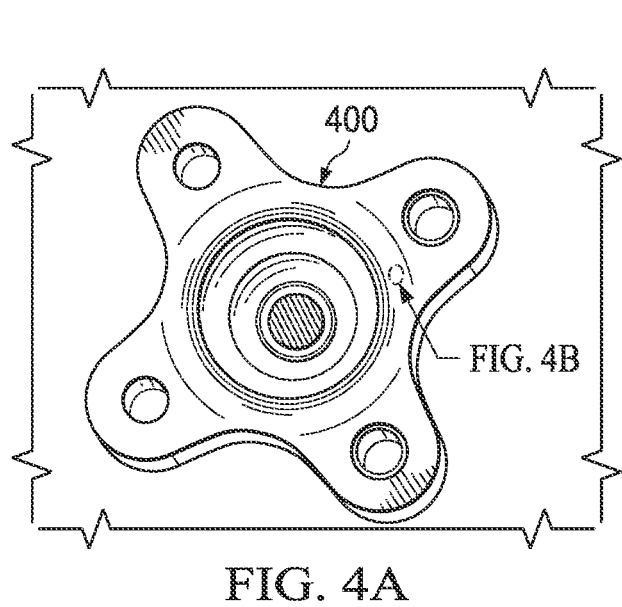
FIG. 4A, FIG. 4B, FIG. 4C, FIG. 4D, and FIG. 4E are examples of anomalies found using the inspection system of FIG. 3, in accordance with one or more embodiments.
Figure 4B:
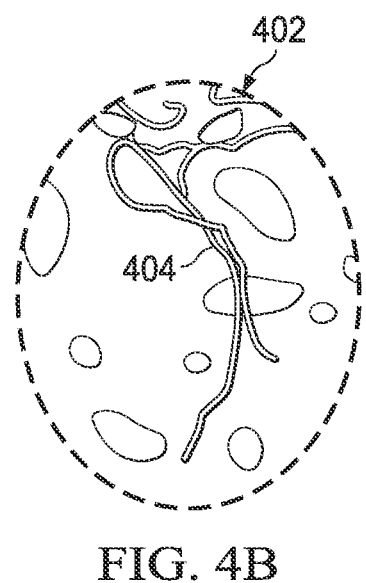

FIG. 4A shows a component (400) of the aircraft (300). The camera is used to magnify a surface of the component (400). Thus, FIG. 4B shows an exploded view (402) of the component (400). An anomaly (404) is automatically detected as existing in the component (400), that otherwise would have been difficult for a human being to see with an unaided eye. The anomaly (404) in this case is an inconsistency. The exploded view (402) is highlighted as a circled area, with a line drawn to the location in the overall component (400) where the anomaly (404) is located.

Figure 4C:
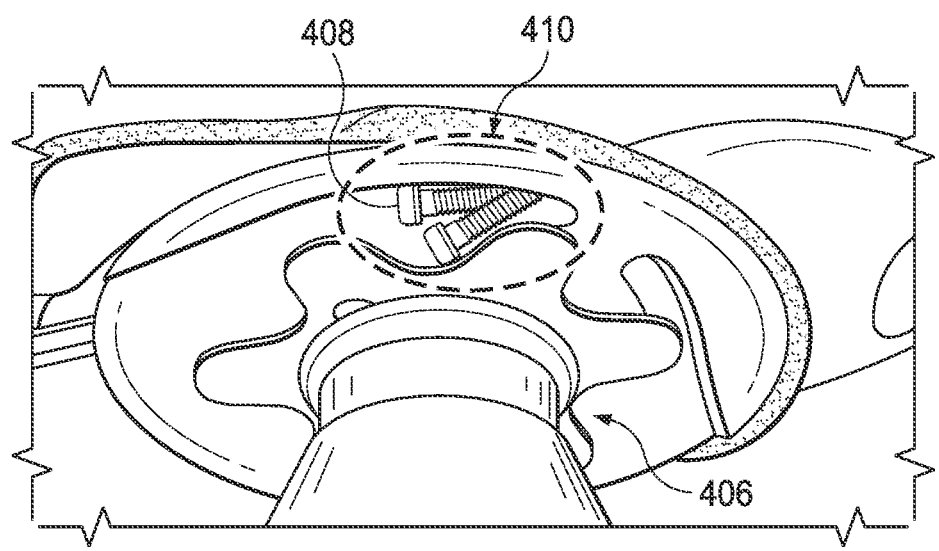

FIG. 4C shows a shaft and gear assembly (406) in the aircraft (300) of FIG. 3. In this example, foreign object debris (FOD) in the form of two loose screws is identified in the shaft and gear assembly (406). The FOD is highlighted by means of an ellipse (410) in this example.

Figure 4D:
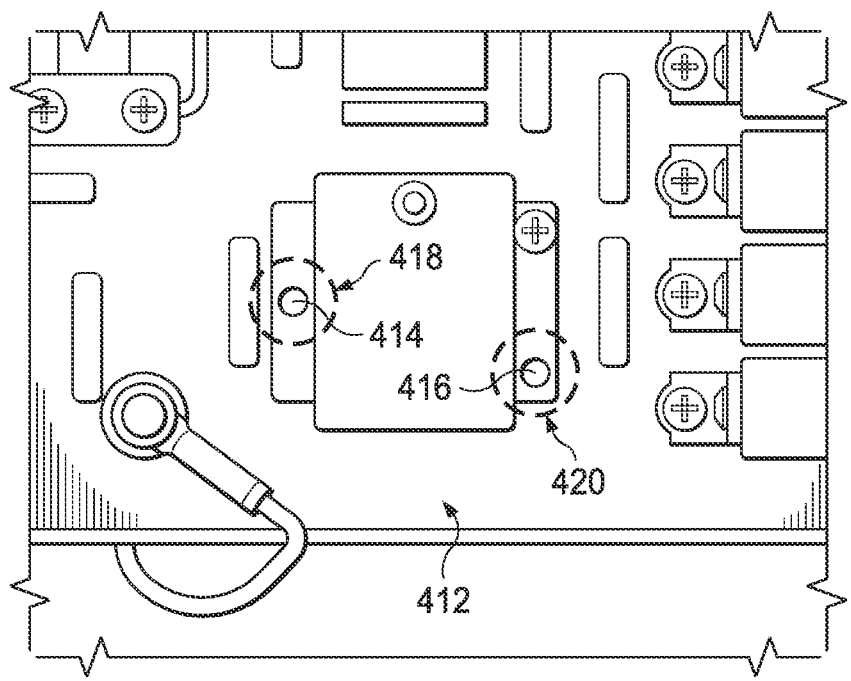

FIG. 4D shows an electronics board (412). The machine learning model AI has identified two anomalies in FIG. 4D. In particular a first connector is missing from a first hole (414) and a second connector is missing from a second hole (416). The fact that the connectors are expected to be present, but are not, is an example of an anomaly. The two anomalies are individually highlighted using circles, specifically first circle (418) and second circle (420).

Figure 4E:
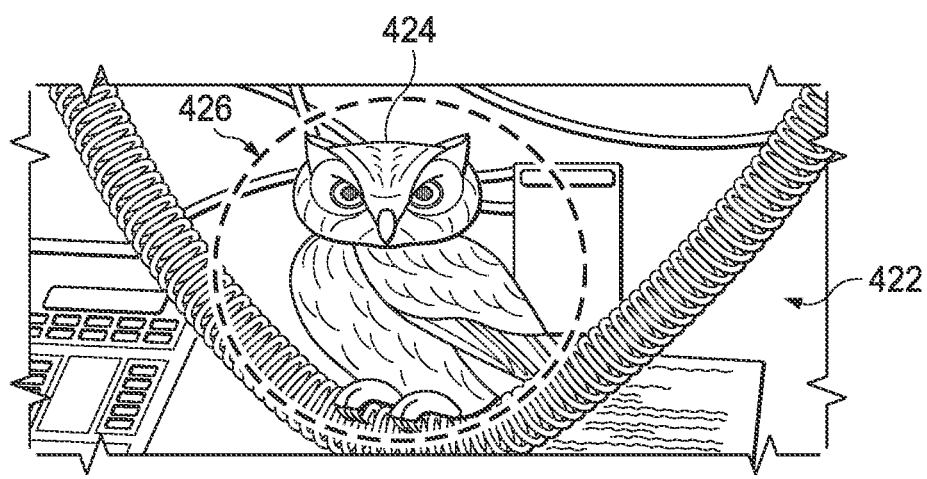

FIG. 4E shows an equipment compartment (422). An anomaly, in the form of an owl (424), is present in the equipment compartment (422). Note that while it is trivial for a human to recognize that the owl (424) should not be in the equipment compartment (422), it is not trivial for a computer to recognize the owl (424), or only a part of the owl (424), as being foreign object debris (FOD). The one or more embodiments described above improve the computer as a tool by giving the computer the capability to recognize the entire owl (424) (as opposed to only parts of the owl (424)) as being FOD, and then highlight the FOD with a circle (426). The technician can then safely and humanely remove and then return the owl (424) to its proper habitat.

Figure 5:
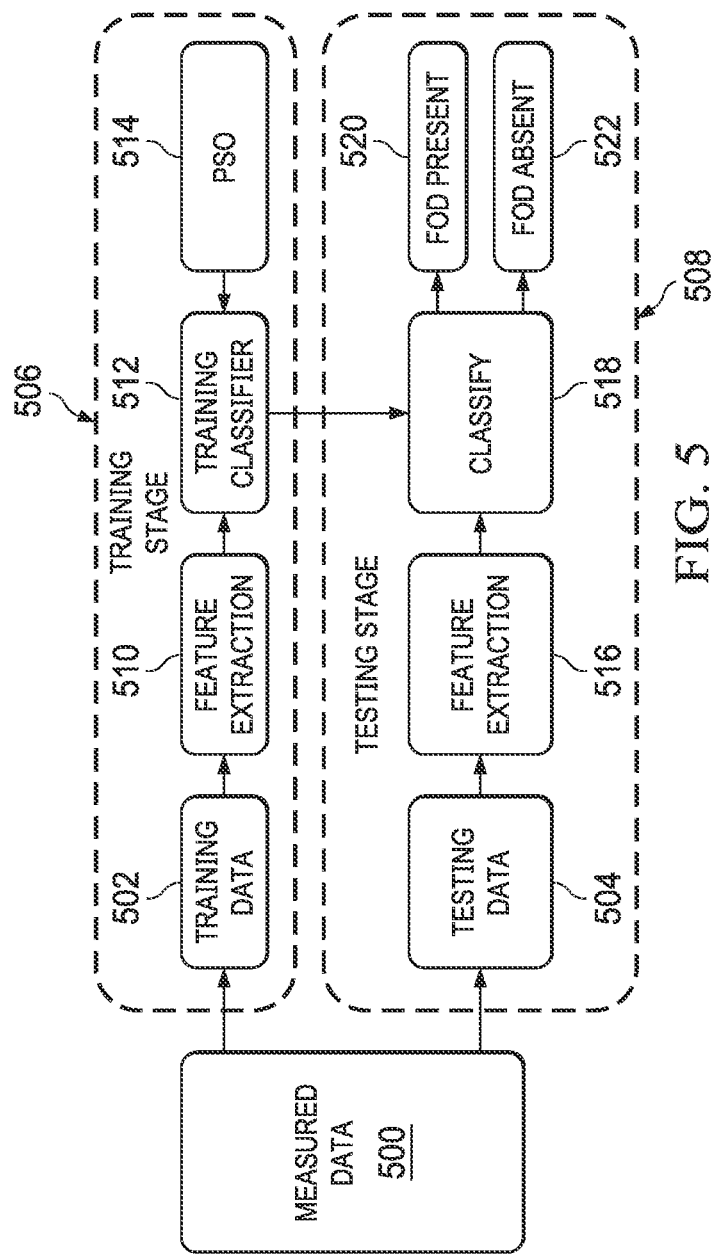
FIG. 5 is a block diagram showing a data flow for training and using an artificial intelligence algorithm for the detection of anomalies, in accordance with one or more embodiments.

FIG. 5 through FIG. 6B should be considered together. FIG. 5 is a block diagram showing a data flow for training and using an artificial intelligence algorithm for the detection of anomalies, in accordance with one or more embodiments. FIG. 6A and FIG. 6B are graphs of test results of using an artificial intelligence algorithm to detect the presence of a foreign object debris anomaly, in accordance with one or more embodiments. Together, FIG. 5 through FIG. 6B provide additional details on the detection and processing of anomalies in images using a machine learning model AI. While the term "FOD" (foreign object debris) is used with respect to FIG. 5 through FIG. 6B, it is contemplated that the term "FOD" may be replaced with other types of anomalies.

Turning first to FIG. 5, measured data (500) includes two portions, training data (502) and testing data (504). The training data (502) is data used to train the machine learning model AI at the training stage (506). The testing data (504) is data used to test the performance of a partially trained or untrained version of the machine learning model at the testing stage (508).

During the training stage (506) features from the training data (502) are extracted during the feature extraction stage (510). A training version of the classifier (512) is then executed on the extracted features. A particle swarm optimization algorithm (514) is also used to help train the training version of the classifier (512), as described with respect to FIG. 2F.

The newly updated training version of the classifier (512) is then tested during the testing stage (508). In particular, a second feature extraction stage (516) extracts features from the testing data (504). The training version of the classifier (512) is then used at a classification stage (518) to classify extracted features. In this example, only two classifications are specified, FOD present (520) and FOD absent (522). The classification may be applied to each tracked object in the extracted features.

Because the objects have been tracked by the AR applications, the locations of objects identified as FOD are also known. In this manner, both the FOD and the location of the FOD can be highlighted appropriately in the AR displayed to the user.

FIG. 6A and FIG. 6B show a first graph (600) and a second graph (602), respectively, of amplitude of signal (604) versus range (606) in meters for images that have been converted to a vector format. The machine learning model AI identifies the first signal pattern (608) as representing FOD being present. The machine learning model AI identifies the second signal pattern (610) as representing FOD being absent.

FOD detection involves binary hypothesis testing and can also be regarded as a binary Classification. PSO-SVDD classifier techniques are used in this embodiment. In this embodiment, there are only two different decision results—FOD present or FOD absent. The small FOD targets detection model can be simply represented as: FODabsent: $Sb(n) = Sc(n)$ and FODpresent: $Sb(n) = Sc(n) + SF(n)$, where $Sc(n)$ and $SF(n)$ are the signals of ground clutter and the FOD target, respectively, and they are independent of each other.

The data of signal $Sb(n)$ were categorized into two kinds, first one was the data corresponding to ground clutter (with FOD absent) (graph 602), and the second was the data that contained the FOD target (with FOD present) (graph 600).

The FOD absent data were taken as the training data in the training stage (506). First, the power spectrum features of each training sample were extracted (feature extraction stage (510)) and combined as an eigenvector to describe the features. Then, all the eigenvectors were combined into an eigenvector matrix to train the SVDD classifier (training version of the classifier (512)). Meanwhile, the PSO algorithm (particle swarm optimization algorithm (514)) was used to optimize the parameters of the classifier (training version of the classifier (512)).

In the testing stage (508), the FOD absent and FOD present data were utilized to validate the classification performance. For each test sample, the power spectrum features were also extracted (second feature extraction stage (516)), and the eigenvector was input into the trained PSO-SVDD classifier (classification stage 518) to obtain the final classification result: FOD present (520) or FOD absent (522). Using the classification procedures described herein, the machine learning model AI can be used to analyze the expected images to detect (classify) FOD, such as screw, bolts, tools, birds etc.

The training version of the classifier (512) is trained according to the following procedure. First, initialize the parameters like C and sigma and segregate the searchable window. Then, initialize the particle swarm parameters like velocity and initial position, etc. Find out the individual extreme of the initial position and the optimal position of the particle swarm. Derive the fitness value of the new position of each particle in the swarm. Compare the current optimal position of each particle with respect to the optimal position of the particle swarm. Update the optimal solution to the current optimal position of particle swarm. Update the position and speed of the particle to the database. Determine whether the SVDD model with the current parameters can minimize the error rate or reach the maximum number of iterations. If one of them is satisfied, the optimal parameters C and sigma are obtained. Otherwise, recalculate the particle fitness value.

The number of screen labeled base clutter is taken and most of the FOD expected samples also feed as vector particles. The samples without FOD for aircraft base structures are loaded as base marked vectors in PSO-SVDD classifier. Support vectors and decision boundaries are also defined. During the real time comparison the method will calculate the particle fitness value and will locate the inside or outside decision boundaries. If it is inside, the FOD is absent and if outside, indicates FOD is present.

Once the FOD objects are identified, the FOD objects are aligned, tracked, and connected with the AR application. The processed FOD present object detectors by vector algorithm are converted to the model target elements with the help of a tracker and a model target generator software tool.

For example, the FOD present screen label model is tracked and the FOD object model also traced with the help of the model target generator tools and trackers of VUFORIA®. The information is downloaded back to the local machine databases. The information is connected to a UNITY® application. Canvases are made for the FOD present or absent of the AR screen label images and marked only at the FOD information in augmented rendering screens. Then, render graphics are added. The output image is then displayed in the mobile application.

In summary, real time image capturing is performed using a mobile camera. Screen labeling and sending is performed by VUFORIA® SDK as the AR input image formats. A model target generator (MTG) application in VUFORIA® is used to get the advance recognition features like images from any angles of the camera and create a model target of each screen label. These model data are sent to cloud databases and used to train the model using the VUFORIA® AI expertise tool. The input for the base elements and FOD expected objects are provided through trained model using VUFORIA® web tools tracker management system.

Figure 7:
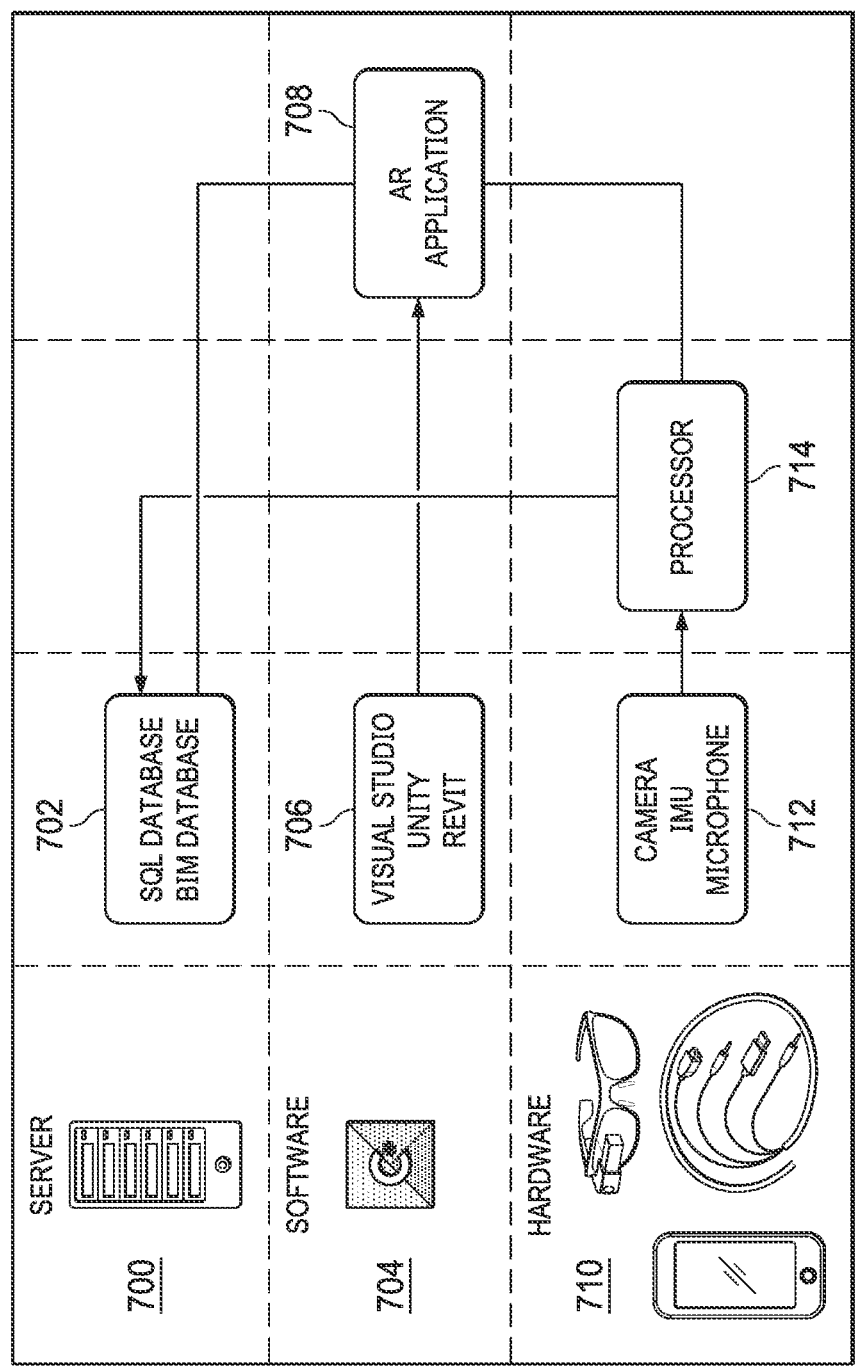
FIG. 7 is an alternative architecture for a system that supports detecting anomalies in objects using a combination of artificial intelligence and augmented reality, in accordance with one or more embodiments.

FIG. 7 is an alternative architecture for a system that supports detecting anomalies in objects using a combination of artificial intelligence and augmented reality, in accordance with one or more embodiments. FIG. 7 represents a specific embodiment of the architecture shown in FIG. 1A through FIG. 1C.

A server (700) maintains databases (702), such as a server query language (SQL) database of anomalies and a building information modelling (BIM) database for different object models for computer generated graphics. The server (700) also executes software (704), such as graphics suite (706) that includes VISUAL STUDIO®, UNITY®, and REVIT®. An AR application (708) is used for rendering graphics. However, other software may be used, such as AR CORE® by GOOGLE®, Tensor Flow Lite as an open source deep learning framework, and a CORE ML® machine learning algorithm.

The server (700) also communicates with the AR hardware (710). The AR hardware (710) may include media equipment (712), such as a camera, an inertial measurement unit (IMU), and a microphone. The IMU can be used to track a position of the camera, and the microphone can be used to add additional graphical elements to the AR display as dictated by the user. The hardware also includes a local processor (714) that coordinates the data flow between the server (700), the AR application (708), and the AR hardware (710).

FIG. 8A and FIG. 8B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processor(s) (802), non-persistent storage device(s) (804) (e.g., volatile memory, such as random access memory (RAM), cache memory), persistent storage device(s) (806) (e.g., a hard disk, an optical drive such as a compact disk (CD) drive or digital versatile disk (DVD) drive, a flash memory, etc.), a communication interface (808) (e.g., Bluetooth interface, infrared interface, network interface, optical interface, etc.), and numerous other elements and functionalities that implement the features and elements of the disclosure.

The computer processor(s) (802) may be an integrated circuit for processing instructions. For example, the computer processor(s) (802) may be one or more cores or micro-cores of a processor. The computing system (800) may also include one or more input device(s) (810), such as a touchscreen, a keyboard, a mouse, a microphone, a touchpad, an electronic pen, or any other type of input device.

The communication interface (808) may include an integrated circuit for connecting the computing system (800) to a network (not shown) (e.g., a local area network (LAN), a wide area network (WAN) such as the Internet, a mobile network, or any other type of network) and/or to another device, such as another computing device.

Further, the computing system (800) may include one or more output device(s) (812), such as a screen (e.g., a liquid crystal display (LCD), a plasma display, a touchscreen, a cathode ray tube (CRT) monitor, a projector, or other display device), a printer, an external storage, or any other output device. One or more of the output device(s) (812) may be the same or different from the input device(s) (810). The input and output device(s) (810 and 812) may be locally or remotely connected to the computer processor(s) (802), the non-persistent storage device(s) (804), and the persistent storage device(s) (806). Many different types of computing systems exist, and the aforementioned input and output device(s) (810 and 812) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system (800) shown in FIG. 8A, or a group of nodes combined may correspond to the computing system (800) shown in FIG. 8A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system (800) shown in FIG. 8A. Further, the client device (826) may include and/or perform all or a portion of the one or more embodiments.

The computing system (800) or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (800) in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (800) of FIG. 8A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (800) in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (800) of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (800) of FIG. 8A and the nodes (e.g., node X (822), node Y (824)) and/or client device (826) in FIG. 8B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
   taking, with a camera, an image of a physical object;
   processing the image by:
   converting the image into a vector data file,
   inputting the vector data file to a trained machine learning model artificial intelligence (AI),
   executing the AI on the vector data file to produce an output comprising a classification of an anomaly in the image, and
   converting the output into a reconfigured output comprising a data format configured for use with augmented reality (AR) hardware, wherein converting the output into the reconfigured output comprises:
   tracking the anomaly based on the classification to generate a first tracked object,
   aligning the first tracked object with the image of the physical object, and
   generating, responsive to the AI classifying the anomaly as anomalous, the reconfigured output comprising render graphics executable by the AR hardware to perform highlighting with respect to the first tracked object;
   transmitting the reconfigured output to the AR hardware;
   displaying, using the reconfigured output, the physical object on a display device of the AR hardware; and
   highlighting, on the display device concurrently with displaying the physical object, the anomaly.

2. The method of claim 1, wherein converting the output into the reconfigured output further comprises:
   tracking the anomaly with an image registration application, the image registration application further tracking a plurality of additional tracked objects in the image of the physical object; and
   aligning the first tracked object with a graphical rendering application, and further aligning the plurality of additional tracked objects with the image of the physical object.

3. The method of claim 1, further comprising:
   prior to processing the image, transmitting the image to a cloud-based application and processing the image at the cloud-based application.

4. The method of claim 1, wherein taking the image comprises at least one of:
   taking the image with a mobile phone in which the camera is installed,
   taking the image remotely, wherein the camera comprises a remote camera in communication with the display device.

5. The method of claim 1, wherein the anomaly is selected from the group consisting of: foreign object debris (FOD), absence of an expected component, an inconsistency, an out-of-tolerance orientation of components, and combinations thereof.

6. The method of claim 1, further comprising training the AI, wherein training comprises iteratively performing, until convergence, steps comprising:
   converting training data into a data vector, wherein the training data comprises a plurality of images of a plurality of objects having a corresponding plurality of known anomalies;
   executing an untrained machine learning model AI, having a parameter, on the data vector to output a plurality of initial classifications of the corresponding plurality of known anomalies;
   comparing the plurality of initial classifications to the corresponding plurality of known anomalies to generate a difference;
   generating a loss function based on the difference;
   updating the untrained machine learning model AI using the loss function, wherein updating is performed by using the loss function to change the parameter to an updated parameter to change the untrained machine learning model AI to an updated machine learning model AI; and
   executing the updated machine learning model AI on the data vector,
   wherein, upon convergence, the updated machine learning model AI is the trained machine learning model AI having a trained parameter.

7. The method of claim 1, further comprising training the machine learning model AI, wherein the machine learning model AI comprises a particle swarm optimization support vector data description (PSO-SVDD) classifier, and wherein training comprises:
   converting training data into a data vector, wherein the training data comprises a plurality of images of a plurality of objects having a corresponding plurality of known anomalies;
   initializing a "C" parameter and a "sigma" parameter of the PSO-SVDD classifier and setting a searchable range of parameters;
   initializing a particle swarm, including a population size "W", a first acceleration constant, "C1", a second acceleration constant, "C2," an inertial weight "$I_w$", a maximum number of iterations, "$I_t$", a particle speed, "S", and a particle position, "P", determining an individual extreme of the particle position, "$P_e$", and an optimal position of the particle swarm, "$P_o$",
   wherein initializing "C", "sigma", the searchable range of parameters, "W", "C1", "C2", "$I_w$", "$I_t$", "S", "P", "$P_e$", and "$P_o$" together establish initial parameters;
   calculating fitness values of new positions of each particle in the particle swarm;
   comparing current optimal positions of each particle with the optimal position of the particle swarm, and updating an optimal solution to the current optimal positions;
   updating speeds and positions of particles in the particle swarm; and
   iteratively executing, until convergence, an untrained PSO-SVDD machine learning model AI, having the initial parameters, on the data vector to output a plurality of classifications of the corresponding plurality of known anomalies, including determining whether the untrained PSO-SVDD machine learning model AI with current parameters minimizes an error rate or reaches the maximum number of iterations, and further including recalculating particle fitness values at each iteration,
   wherein, upon convergence, the untrained PSO-SVDD machine learning model AI is the trained machine learning model AI.

8. A system comprising:
   augmented reality (AR) hardware comprising a processor, a display device in communication with the processor, and a camera in communication with the processor; and a data repository comprising a non-transitory computer readable storage medium in communication with the AR hardware, and storing:
  a machine learning model artificial intelligence (AI) trained, on a training data set comprising a plurality of images having a corresponding plurality of known anomalies, to detect the corresponding plurality of known anomalies in the plurality of images,
  a vector data file representation of an image of an unknown object,
  a classification, output by the AI, of the unknown object, the classification comprising one of an anomaly being present and the anomaly being absent, wherein the anomaly is one of the corresponding plurality of known anomalies, and computer readable program code, comprising:
  computer readable program code executable to cause the AI to take,
    as input, the vector data file representation of the image of the unknown object, and to output the classification,
  computer readable program code comprising a data conversion application executable to convert the output classification to an AR input for the AR hardware, wherein converting the output classification into the AR input comprises:
    responsive to the anomaly being present, tracking the anomaly based on the classification to generate a first tracked object,
    aligning the first tracked object with the image of the unknown object, and
    generating the AR input comprising render graphics executable by the AR hardware to perform highlighting with respect to the first tracked object, and
  computer readable program code comprising an AR services application executable to display the image of the unknown object on the display device and further to highlight the anomaly on the display device, when the anomaly is present.

9. The system of claim 8, wherein the data repository further comprises a database of a plurality of expected outputs of the machine learning model AI, and wherein computer readable program code comprising the data conversion application executable to convert the output classification to the AR input for the AR hardware further comprises:
  computer readable program code for comparing the classification to the plurality of expected outputs;
  computer readable program code for identifying a difference between the classification and the plurality of expected outputs; and
  identifying a portion of the image associated with the difference, the portion of the image comprising the AR input.

10. The system of claim 8, wherein the AR hardware is selected from the group consisting of: video glasses; a mobile phone; a laptop computer; a camera embedded in the video glasses, the mobile phone, or the laptop computer; a fiber optic cable connected to the camera and to the video glasses, the mobile phone, or the laptop computer; and combinations thereof.

11. The system of claim 8, wherein the data repository is a local component of the AR hardware.

12. The system of claim 8, further comprising:
a remote server in communication with the AR hardware, wherein the data repository is located remotely from the AR hardware and is in communication with the remote server, and wherein the computer readable program code further comprises:
  a first application programming interface (API) configured to transmit the image of the unknown object to the remote server, and
  a second API configured to transmit the AR input from the remote server to the AR hardware.

13. The system of claim 8, further comprising:
a logging database configured to log the anomaly.

14. The system of claim 8, further comprising:
an alert device configured to transmit an alert to a remote facility when the anomaly is detected.

15. A non-transitory computer readable storage medium storing computer readable program code which, when executed by a processor, performs a computer-implemented method comprising:
  taking, with a camera, an image of a physical object;
  processing the image by:
    converting the image into a vector data file,
    inputting the vector data file to a trained machine learning model artificial intelligence (AI),
    executing the AI on the vector data file to produce an output comprising a classification of an anomaly in the image, and
    converting the output into a reconfigured output comprising a data format configured for use with augmented reality (AR) hardware, wherein converting the output into the reconfigured output comprises:
      tracking the anomaly based on the classification to generate a first tracked object,
      aligning the first tracked object with the image of the physical object, and
      generating, responsive to the AI classifying the anomaly as anomalous, the reconfigured output comprising render graphics executable by the AR hardware to perform highlighting with respect to the first tracked object;
  transmitting the reconfigured output to the AR hardware;
  displaying, using the reconfigured output, the physical object on a display device of the AR hardware; and
  highlighting, on the display device concurrently with displaying the physical object, the anomaly.

16. The non-transitory computer readable storage medium of claim 15, wherein the computer readable program code, when executed to convert the output into the reconfigured output, further comprises computer readable program code for:
  comparing the output to a database, the database including at least an expected output of the machine learning model AI when the anomaly is present;
  identifying a difference between the output and the expected output; and
  identifying a portion of the image associated with the difference, the portion of the image comprising the reconfigured output,
  wherein highlighting comprises highlighting the portion.

17. The non-transitory computer readable storage medium of claim 15, wherein the computer readable program code further comprises computer readable program code for:
  prior to processing the image, transmitting the image to a cloud-based application and processing the image at the cloud-based application.

18. The non-transitory computer readable storage medium of claim 15, wherein the computer readable program code for taking the image comprises at least one of computer readable program code for:
 taking the image with a mobile phone in which the camera is installed,
 taking the image remotely, wherein the camera comprises a remote camera in communication with the display device.

19. The non-transitory computer readable storage medium of claim 15, further comprising computer readable program code for training the AI, wherein the computer readable program code for training comprises computer readable program code for iteratively performing, until convergence, steps comprising:
 converting training data into a data vector, wherein the training data comprises a plurality of images of a plurality of objects having a corresponding plurality of known anomalies;
 executing an untrained machine learning model AI, having a parameter, on the data vector to output a plurality of initial classifications of the corresponding plurality of known anomalies;
 comparing the plurality of initial classifications to the corresponding plurality of known anomalies to generate a difference;
 generating a loss function based on the difference, wherein the loss function changes the parameter to an updated parameter and changes the untrained machine learning model AI to an updated machine learning model AI; and
 executing the updated machine learning model AI on the data vector,
 wherein, upon convergence, the updated machine learning model AI is the trained machine learning model AI having a trained parameter.

20. The non-transitory computer readable storage medium of claim 15, further comprising computer readable program code for training the machine learning model AI, wherein the machine learning model AI comprises a particle swarm optimization support vector data description (PSO-SVDD) classifier, and wherein the computer readable program code for training comprises computer readable program code for:
 converting training data into a data vector, wherein the training data comprises a plurality of images of a plurality of objects having a corresponding plurality of known anomalies;
 initializing a "C" parameter and a "sigma" parameter of the PSO-SVDD classifier and setting a searchable range of parameters;
 initializing a particle swarm, including a population size "W", a first acceleration constant, "C1", a second acceleration constant, "C2," an inertial weight "$I_w$", a maximum number of iterations, "$I_t$", a particle speed, "S", and a particle position, "P", determining an individual extreme of the particle position, "$P_e$", and an optimal position of the particle swarm, "$P_o$",
 wherein initializing "C", "sigma", the searchable range of parameters, "W", "C1", "C2", "$I_w$", "$I_t$", "S", "P", "$P_e$", and "$P_o$" together establish initial parameters;
 calculating fitness values of new positions of each particle in the particle swarm;
 comparing current optimal positions of each particle with the optimal position of the particle swarm, and updating an optimal solution to the current optimal positions;
 updating speeds and positions of particles in the particle swarm; and
 iteratively executing, until convergence, an untrained PSO-SVDD machine learning model AI, having the initial parameters, on the data vector to output a plurality of classifications of the corresponding plurality of known anomalies, including determining whether the untrained PSO-SVDD model machine learning model AI with current parameters minimizes an error rate or reaches the maximum number of iterations, and further including recalculating particle fitness values at each iteration,
 wherein, upon convergence, the untrained PSO-SVDD machine learning model AI is the trained machine learning model AI.

* * * * *